(12) United States Patent
Guillot et al.

(10) Patent No.: US 10,203,519 B2
(45) Date of Patent: Feb. 12, 2019

(54) SYSTEMS AND METHODS FOR AUGMENTED REALITY

(71) Applicant: Essilor International, Charenton le Pont (FR)

(72) Inventors: Matthieu Guillot, Charenton-le-Pont (FR); Pauline Colas, Charenton-le-Pont (FR); Sebastien Fricker, Charenton-le-Pont (FR); Benjamin Rousseau, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 0 days.

(21) Appl. No.: 15/301,322

(22) PCT Filed: Mar. 10, 2015

(86) PCT No.: PCT/EP2015/054992
§ 371 (c)(1),
(2) Date: Sep. 30, 2016

(87) PCT Pub. No.: WO2015/150030
PCT Pub. Date: Oct. 8, 2015

(65) Prior Publication Data
US 2017/0031179 A1    Feb. 2, 2017

(30) Foreign Application Priority Data

Apr. 1, 2014   (EP) ..................................... 14290090

(51) Int. Cl.
| | |
|---|---|
| *A61B 3/10* | (2006.01) |
| *G02C 7/02* | (2006.01) |
| *G02C 13/00* | (2006.01) |
| *G02C 7/08* | (2006.01) |
| *G02B 27/01* | (2006.01) |

(52) U.S. Cl.
CPC ........... *G02C 7/027* (2013.01); *G02B 27/017* (2013.01); *G02C 7/024* (2013.01); *G02C 7/025* (2013.01); *G02C 7/028* (2013.01); *G02C 13/003* (2013.01); *G02C 13/005* (2013.01); *G02B 2027/011* (2013.01); *G02B 2027/014* (2013.01);
(Continued)

(58) Field of Classification Search
CPC ........ G02C 7/027; G02C 7/028; G02C 7/061; G02C 1/00; G02C 13/005; G02B 2027/0156; G02B 2027/0178
USPC ............ 345/7–9; 351/203–210; 359/13, 630, 359/632
See application file for complete search history.

(56) References Cited

U.S. PATENT DOCUMENTS

| | | |
|---|---|---|
| 2009/0296043 A1 | 12/2009 | Moliton et al. |
| 2010/0002191 A1 | 1/2010 | Drobe |

(Continued)

FOREIGN PATENT DOCUMENTS

| | | |
|---|---|---|
| EP | 2 372 431 A2 | 10/2011 |
| FR | 2 866 442 A1 | 8/2005 |

(Continued)

OTHER PUBLICATIONS

International Search Report dated Jun. 2, 2015 in PCT/EP2015/054992 Filed Mar. 10, 2015.

*Primary Examiner* — Mahidere Sahle
(74) *Attorney, Agent, or Firm* — Oblon, McClelland, Maier & Neustadt, L.L.P.

(57) ABSTRACT

Methods for augmented reality, and to lenses, systems and methods for improving visual comfort of a wearer equipped with a head-mounted device configured for display of information content.

2 Claims, 30 Drawing Sheets

(52) U.S. Cl.
CPC ............... *G02B 2027/0123* (2013.01); *G02B 2027/0178* (2013.01); *G02C 7/088* (2013.01)

(56) References Cited

U.S. PATENT DOCUMENTS

| | | |
|---|---|---|
| 2010/0045927 A1 | 2/2010 | Moliton et al. |
| 2010/0171922 A1 | 7/2010 | Sessner et al. |
| 2011/0234476 A1 | 9/2011 | Sugihara et al. |
| 2012/0057122 A1 | 3/2012 | Guillot et al. |
| 2012/0147317 A1 | 6/2012 | Loeb, Jr. et al. |
| 2015/0124214 A1 | 5/2015 | Contet et al. |

FOREIGN PATENT DOCUMENTS

| | | |
|---|---|---|
| FR | 2 912 820 A1 | 8/2008 |
| FR | 2 938 934 A1 | 11/2008 |
| WO | WO 2008/003903 A2 | 1/2008 |
| WO | 2014/001495 A1 | 1/2014 |

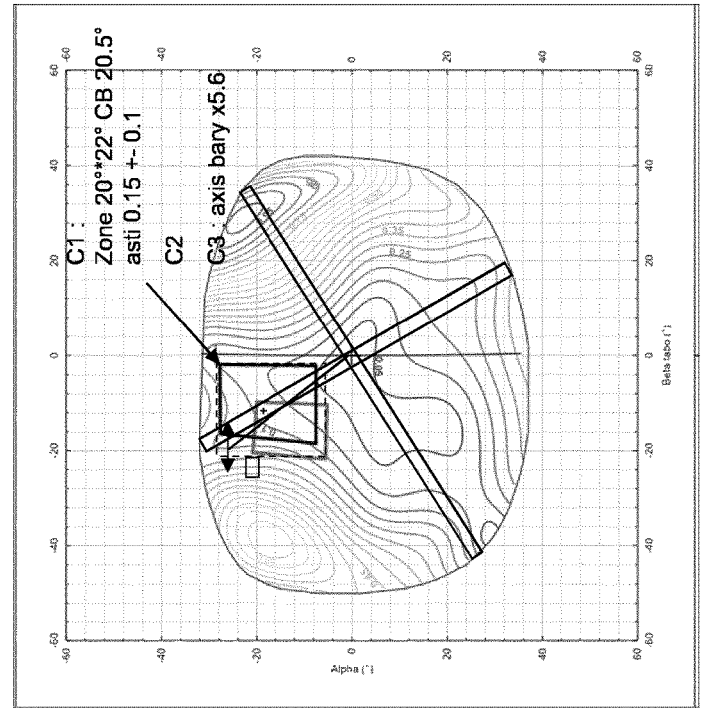
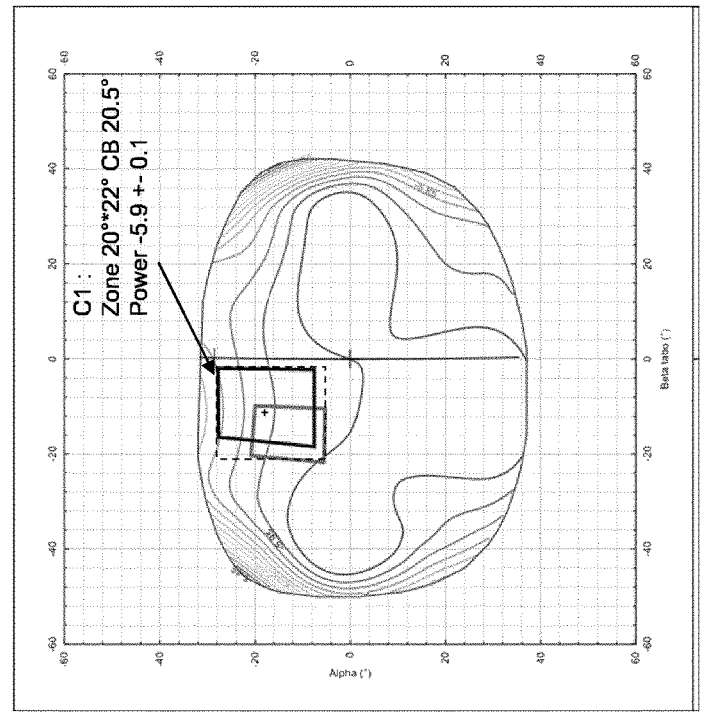
FIG. 16

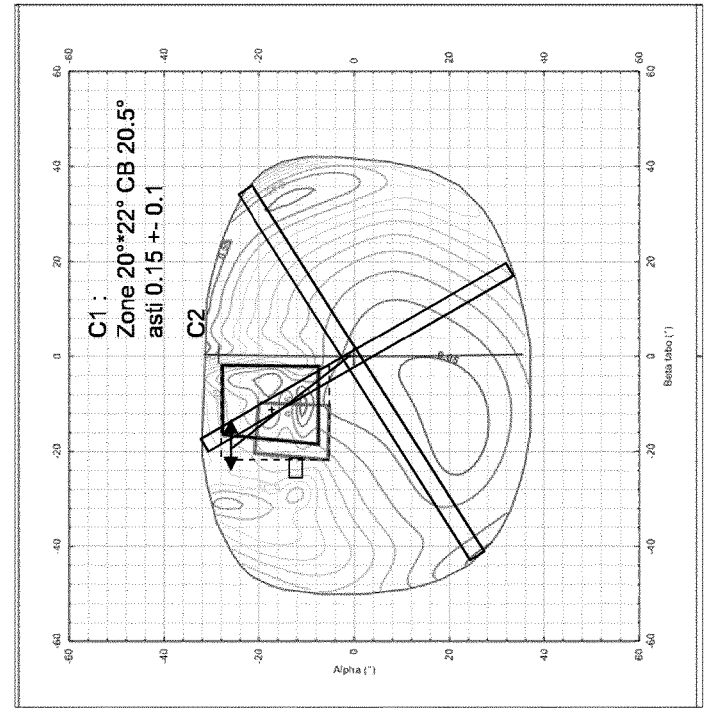
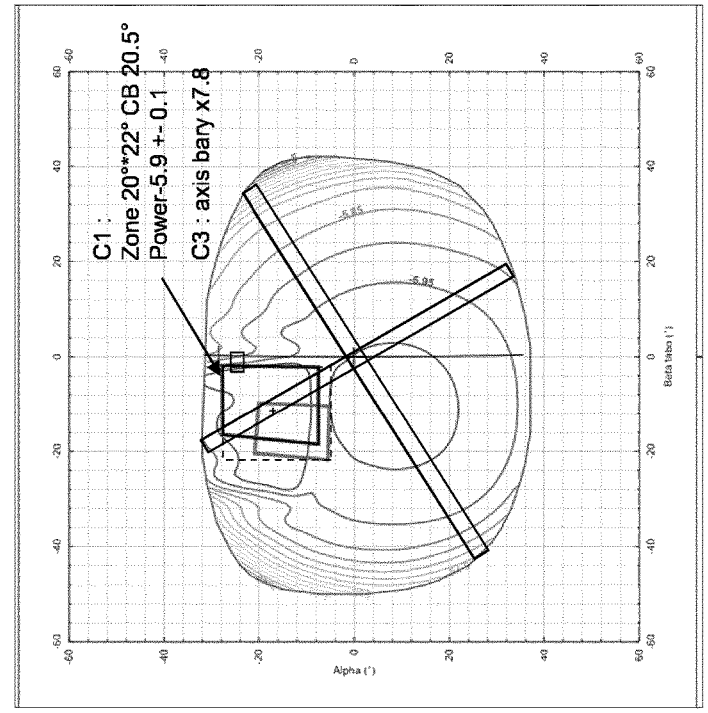
FIG. 17

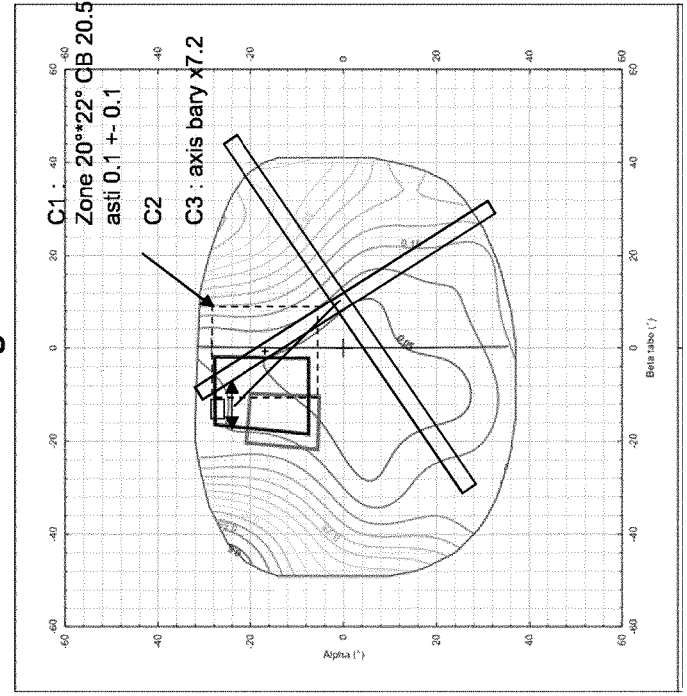
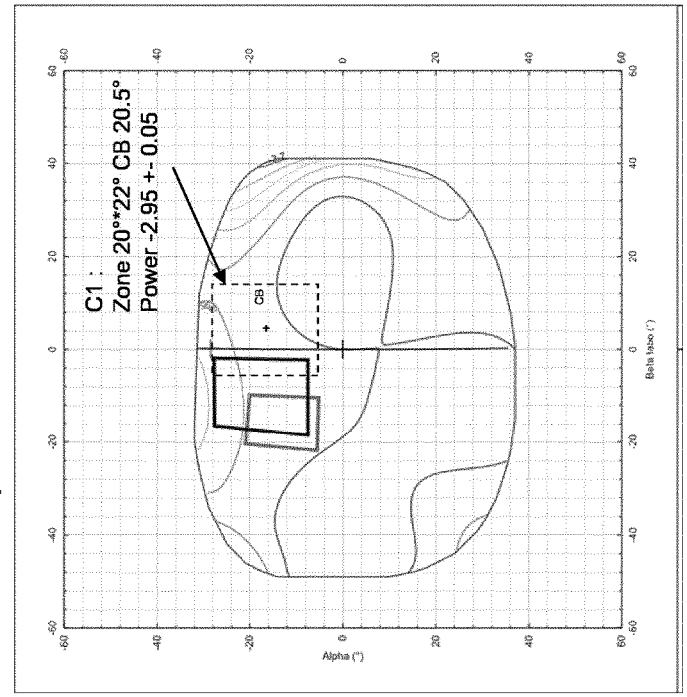
FIG. 20

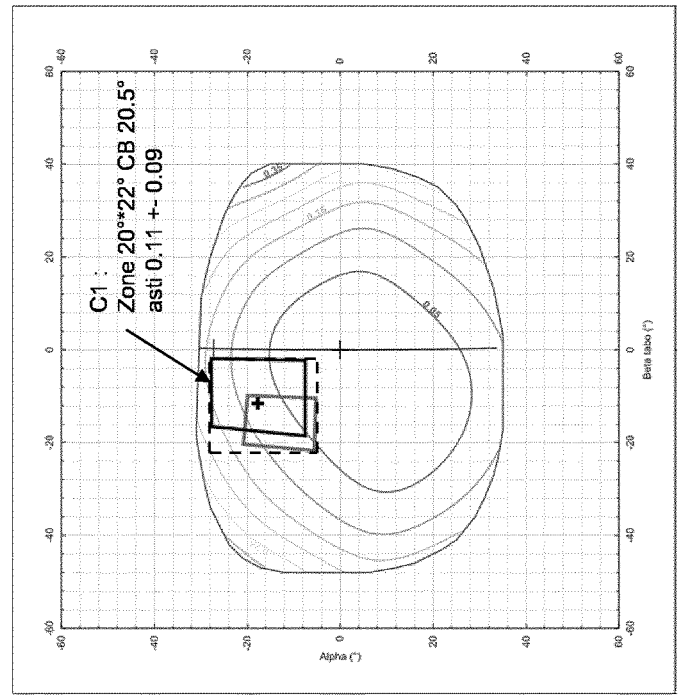
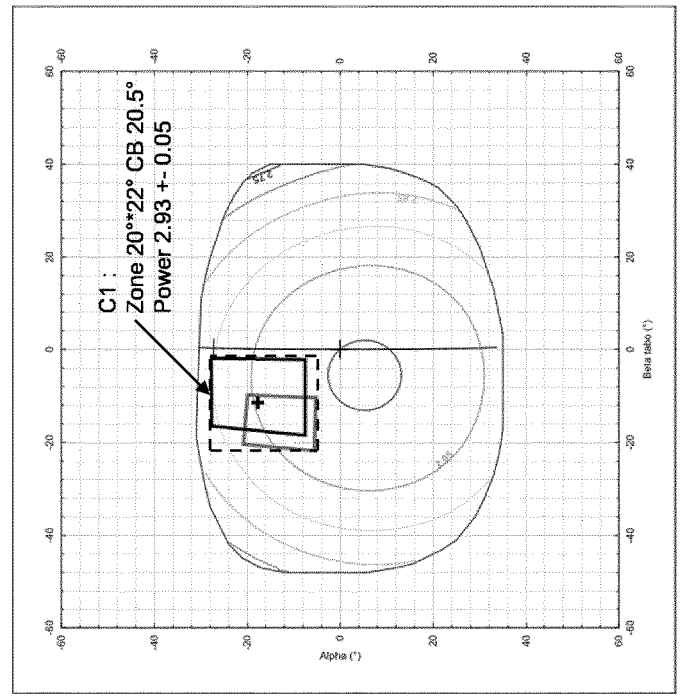
FIG. 23

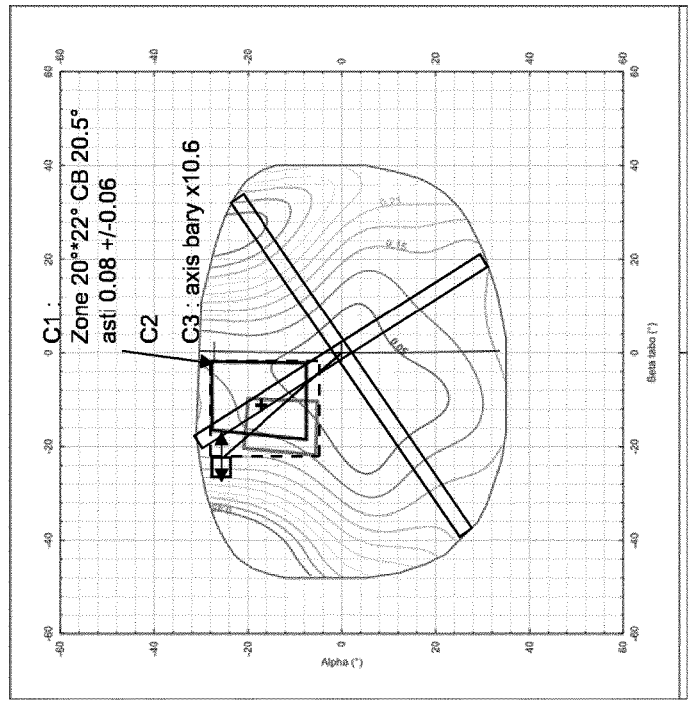
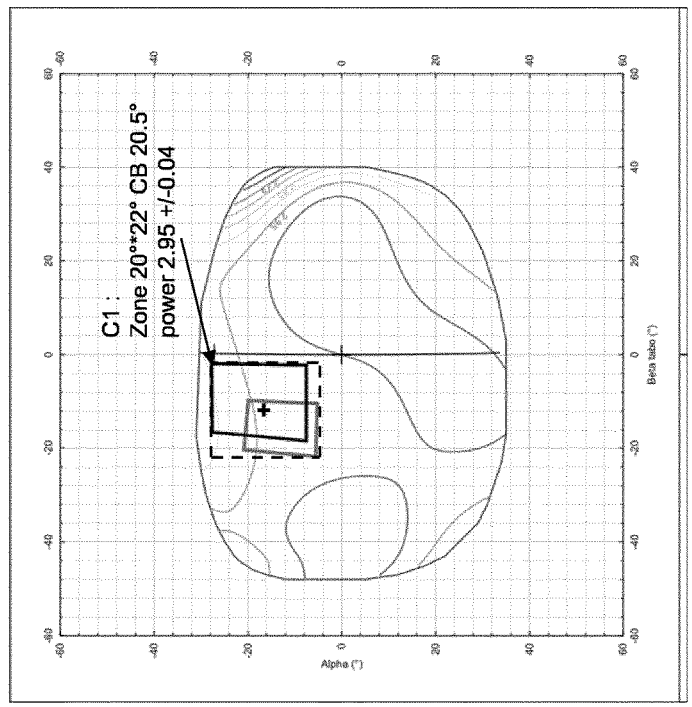
FIG. 24

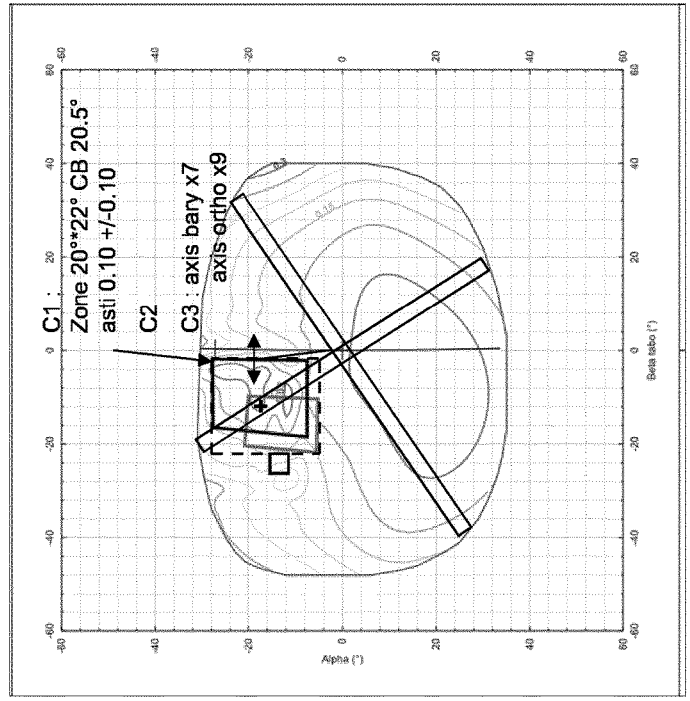
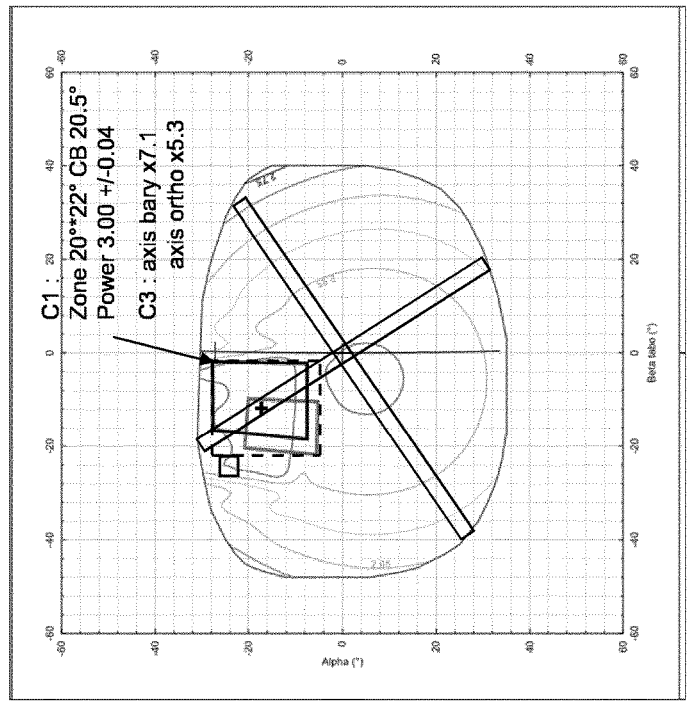
FIG. 25

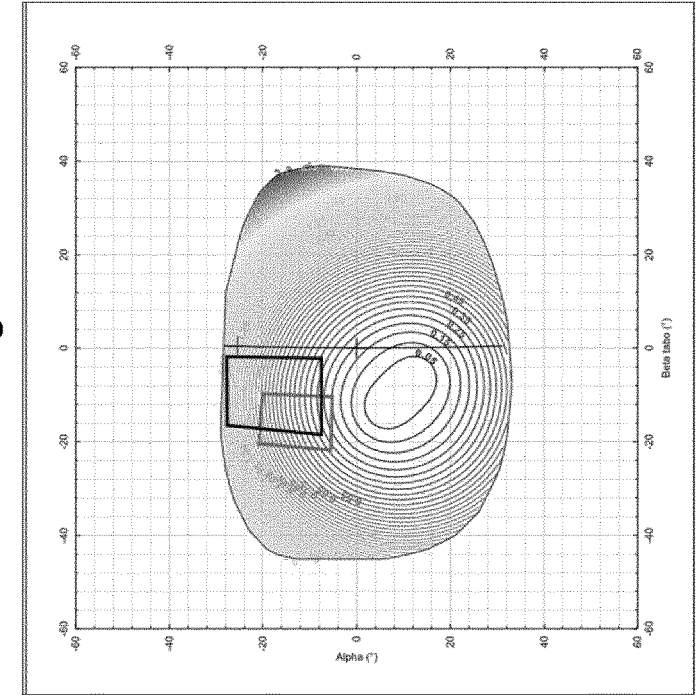
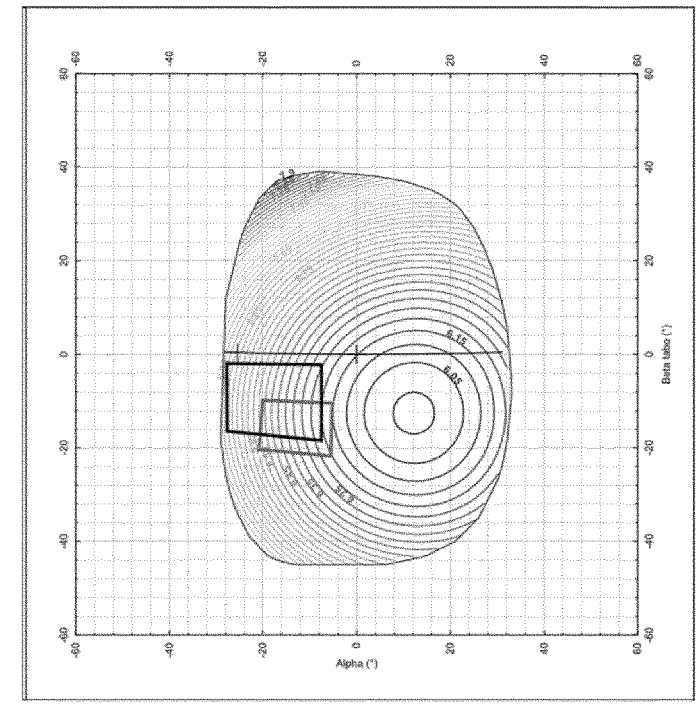
FIG. 26

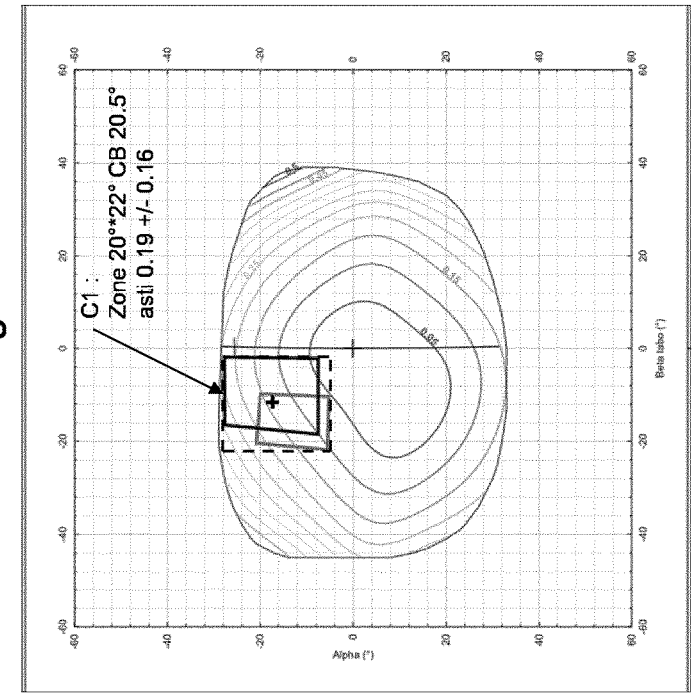
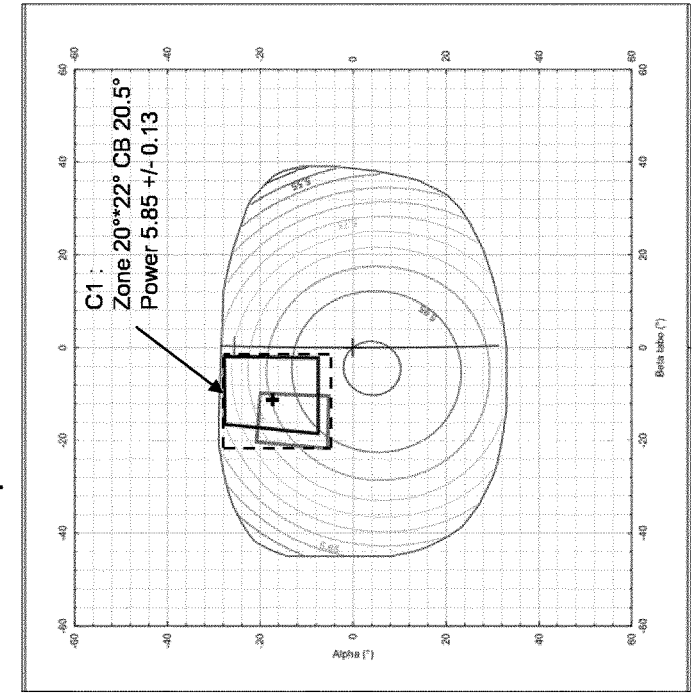
FIG. 27

OPTIM2 +6.00
Unwanted astigmatism
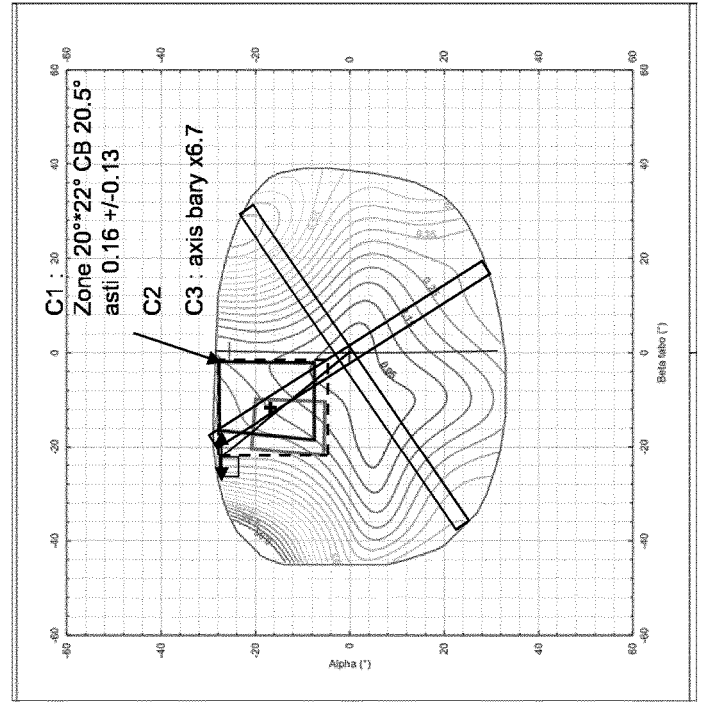
Optical Power
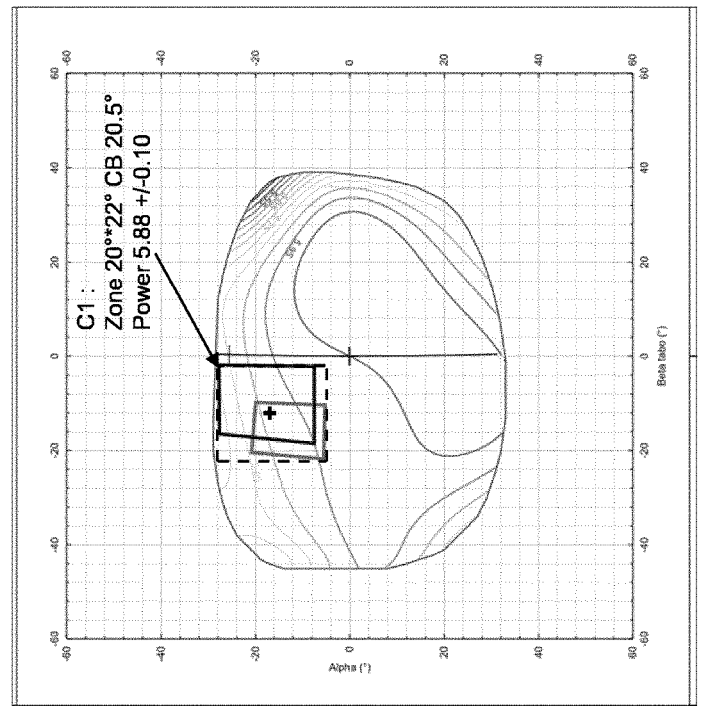
FIG. 28

OPTIM3 +6.00
Unwanted astigmatism
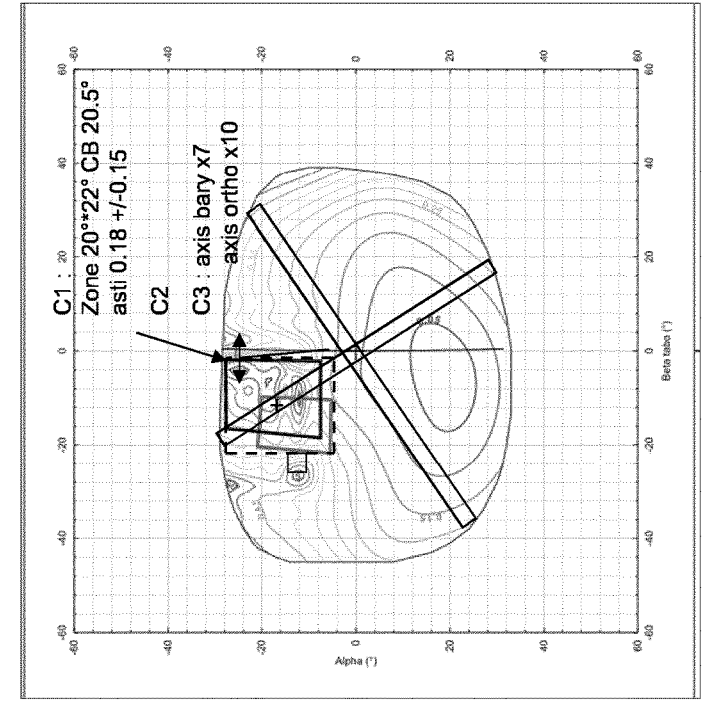
Optical Power
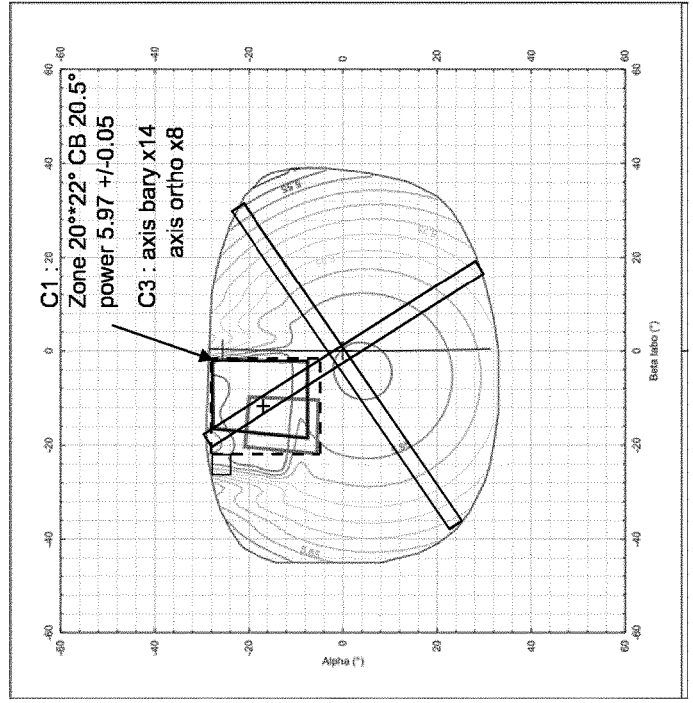
FIG. 29

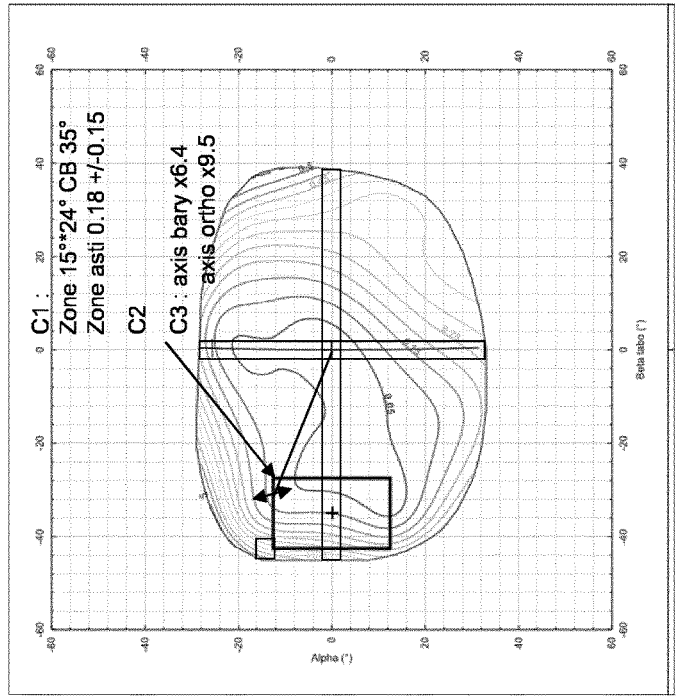
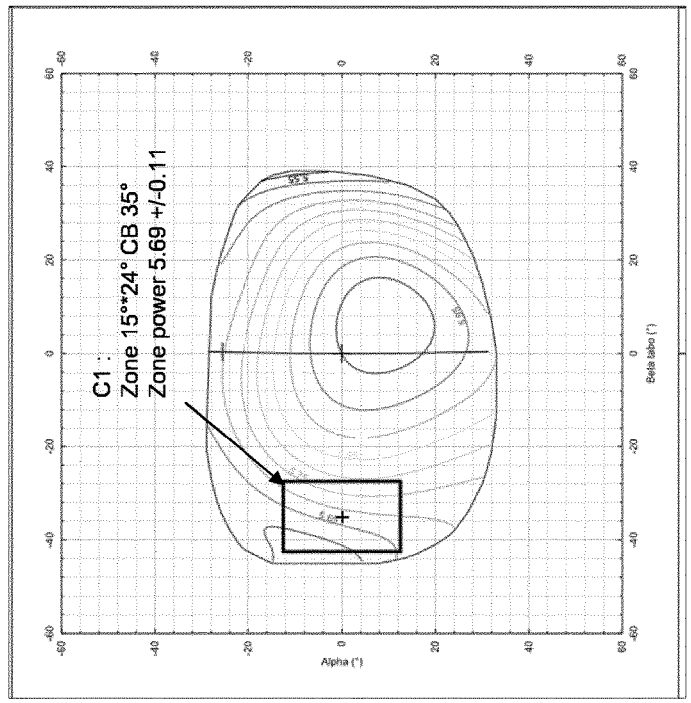
FIG. 30

OPTIM2 +6.00
Unwanted astigmatism
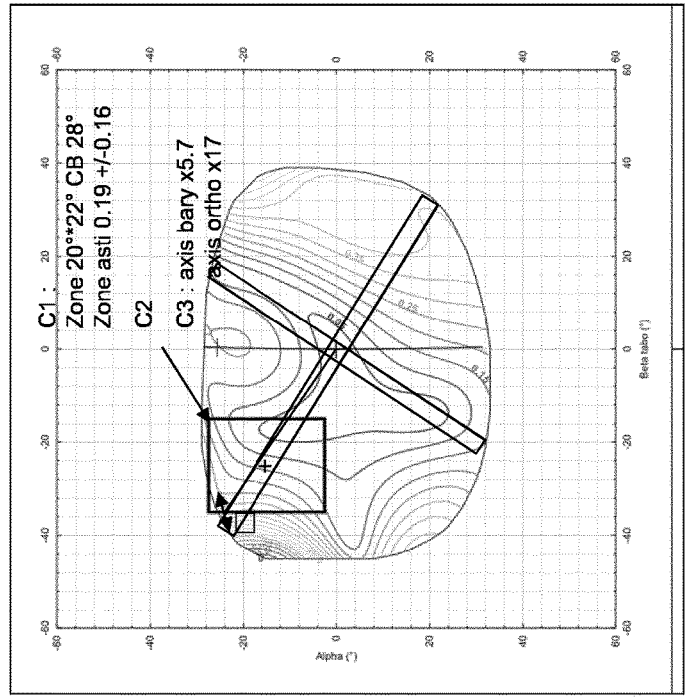
Optical Power
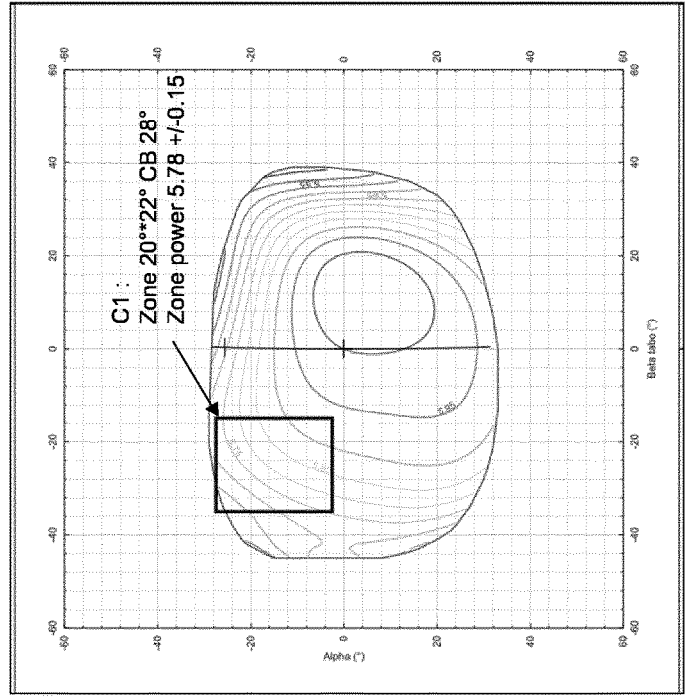
FIG. 31

OPTIM2: −6.00
Unwanted astigmatism
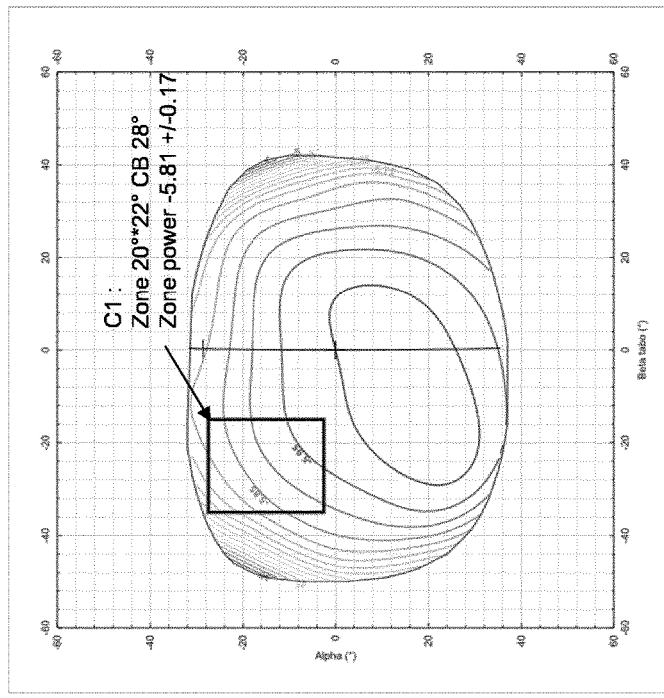
Optical Power
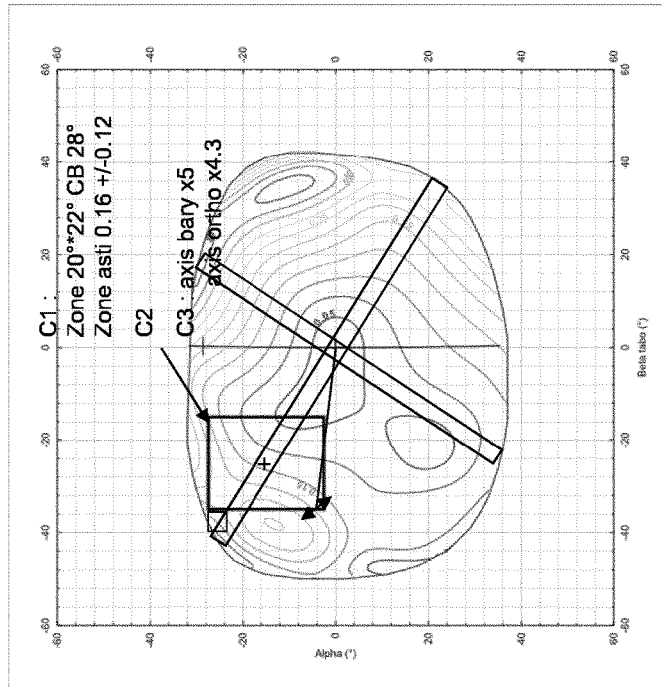
FIG. 32

SYSTEMS AND METHODS FOR AUGMENTED REALITY

FIELD OF THE INVENTION

The invention relates to methods, systems and devices for augmented reality.

The invention relates more particularly to lenses and methods for improving the visual comfort of a wearer equipped with a head-mounted display device.

BACKGROUND OF THE INVENTION

Head-mounted display devices, such as 'smart-glasses', are known in the art. Such devices can allow a wearer to enjoy dual visualization: on the one hand, visualization of 'real life' objects by 'natural' vision; and on the other hand, visualization of 'virtual' items on a display. The 'virtual' items are generally computer-generated information content, such as text, images, etc.

SUMMARY OF THE INVENTION

For an ametropic wearer, visualization of 'real life' objects requires correction. This can be achieved with prescription ophthalmic lenses that are designed to correct the wearer's sight defects so that the wearer enjoys optimal visual acuity. The ophthalmic lenses may advantageously be customized to the individual wearer for an improved level of visual comfort. The ophthalmic lenses may be contact lenses or intraocular lenses. However, these types of lenses are not suitable for all wearers. Some wearers may also favor eyeglasses for personal reasons other than actual medical contra-indications. Such wearers then turn to spectacle lenses.

Thus, ametropic wearers using a head-mounted display device require that the device comprise eyeglasses lenses that provide for enhanced visual comfort for both situations of 'natural' vision and 'virtual' vision.

In broad terms, the present invention provides methods, systems and devices leading to improved visual comfort of an ametropic wearer using a head-mounted display device. According to the invention, the head-mounted display device comprises an ophthalmic lens and a display element. The display element is arranged in a configuration such that, when the wearer wears the head-mounted display device, the ophthalmic lens is located between the display element and the eye/face of the wearer. This is by contrast to head-mounted devices wherein the display element is embedded within the bulk of a lens.

In one aspect, the present invention provides an ophthalmic lens supply system. The lens supply system allows the supply of a personalized/customized ophthalmic lens, based upon wearer data such as prescription data and/or biometry data; and upon head-mounted display device data.

In another aspect, the present invention provides a computer-implemented method for the determination (calculation) of an ophthalmic lens intended to be fitted onto a head-mounted display device. The method relies on the design optimization of relevant vision zones of the lens, and notably optimization of the portion of the lens that is useful for 'virtual' vision.

In another aspect, the present invention provides a method for the supply or manufacture of such ophthalmic lens.

In another aspect, the present invention provides a computer program product and computer readable medium for implementing the methods of the invention.

In another aspect, the present invention provides a head-mounted display device comprising an ophthalmic lens and a display element, wherein the design of the lens is specifically optimized in a relevant area thereof for the visualization of the information content displayed by the display element.

According to the invention, the ophthalmic lens can be a unifocal lens or a progressive addition lens.

According to the invention, the head-mounted display device can be a pair of eyeglasses (smart glasses).

The systems, methods and devices of the invention provide improved visual comfort for the ametropic wearer equipped with a head-mounted display device, so that the wearer's experience is enhanced for both 'natural' vision of the 'real life' world and 'virtual' vision of the information content provided by the device.

This is achieved by the specific combination of a central vision zone of the lens that is optimized for natural vision and of a dedicated peripheral vision zone of the lens that is optimized for virtual vision.

The invention relates to situations wherein the optical power for 'natural' vision is either equal or different to the optical power for the 'virtual' vision. Thus, in some embodiments, the display element is for displaying information content display at infinite distance, whereas in other embodiments, the display element is for displaying information content at a finite distance. For example, in some embodiments, the display element may be configured for displaying the information content at a distance of 0.8 to 4 m, for instance a distance of 0.8 to 1 m.

Further features and advantages of the invention will appear from the following description of embodiments of the invention, given as non-limiting examples, with reference to the accompanying drawings listed hereunder.

BRIEF DESCRIPTION OF THE DRAWINGS

FIGS. 14-38 show optical or surface maps of lenses according to the invention.

It can be appreciated that elements in the figures are illustrated for simplicity and clarity and have not necessarily been drawn to scale. For example, the dimensions of some of the elements in the figures may be exaggerated relatively to other elements to help improving the understanding of the embodiments of the present invention.

Definitions

The following definitions are provided to describe the present invention.

"Prescription data" are known in the art. Prescription data refers to one or more data obtained for the wearer and indicating for each eye a prescribed far vision mean optical power $P_{FV}$, and/or a prescribed astigmatism value $CYL_{FV}$ and/or a prescribed astigmatism axis $AXE_{FV}$ and/ or a prescribed addition A suitable for correcting the ametropia and/or presbyopia of each eye. The mean optical power $P_{FV}$ is obtained by summing the half value of the prescribed astigmatism value $CYL_{FV}$ to the prescribed sphere value $SPH_{FV}$: $P_{FV}=SPH_{FV}+CYL_{FV}/2$. Then, the mean optical power for each eye for proximate (near) vision is obtained by summing the prescribed addition A to the far vision mean optical power $P_{FV}$ prescribed for the same eye: $P_{NV}=P_{FV}+A$. In the case of a prescription for progressive lenses, prescription data comprise wearer data indicating for each eye values for $SPH_{FV}$, $CYL_{FV}$ and A. A prescription is required for correcting ametropia of an optical power or of module of astigmatism of at least 0.25 D. Prescription is also defined for readers ("over the counter" eyeglasses").

"Ophthalmic lenses" are known in the art. According to the invention, the ophthalmic lens may be selected from progressive lenses including progressive addition lenses; monofocal (single vision), bifocal, or more generally multifocal lenses. The lens is for use in a device such as a head-mounted device, for example spectacles (eyeglasses). The lens may be a prescription lens. The lens may also be suitable for filtering amplitude and/or spectrum of light passing through it or not. All ophthalmic lenses obtainable according to the invention may be paired to another lens so as to form a pair of lenses.

Figure 1:
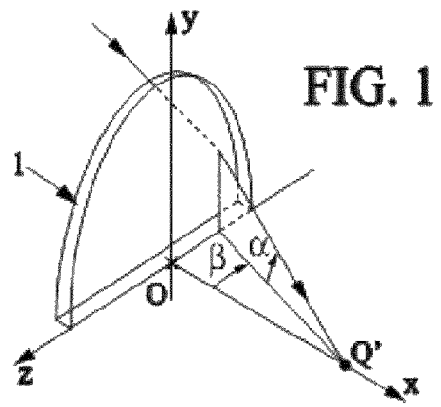
FIGS. 1 to 3 show, diagrammatically, optical systems of eye and lens and ray tracing from the center of rotation of the eye.
Figure 2:
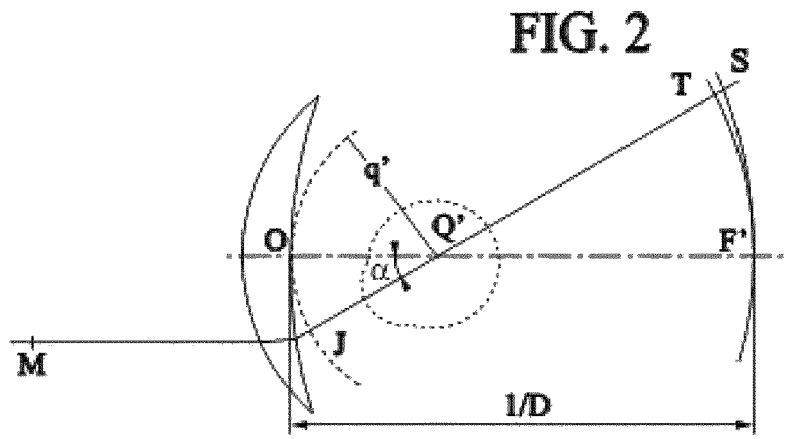

A "gaze direction" can be identified by a couple of angle values $(\alpha,\beta)$, wherein said angles values are measured with regard to reference axes centered on the center of rotation of the eye (CRE). More precisely, FIG. 1 represents a perspective view of such a system illustrating parameters $\alpha$ and $\beta$ used to define a gaze direction. FIG. 2 is a view in the vertical plane parallel to the antero-posterior axis of the wearer's head and passing through the center of rotation of the eye in the case when the parameter $\beta$ is equal to 0. The center of rotation of the eye is labeled Q'. The axis Q'F', shown on FIG. 2 in a dot-dash line, is the horizontal axis passing through the center of rotation of the eye and extending in front of the wearer—that is the axis Q'F' corresponding to the primary gaze direction. This axis cuts the front surface of the lens on a point called the fitting cross, which is present on lenses to enable the positioning of lenses in a frame by an optician. This fitting-cross indicates a reference point on the lens that must intersect the gazing of the wearer when he/she looks at a distance. The fitting cross corresponds to a lowering angle $\alpha$ of 0° and an azimuth angle $\beta$ of 0°. The point of intersection of the rear surface of the lens and the axis Q'F' is the point O. O can be the fitting cross if it is located on the rear surface. A vertex sphere of center Q' and of radius q', which is intercepting the rear surface of the lens in a point of the horizontal axis. As examples, a value of radius q' of 25.5 mm corresponds to a usual value and provides satisfying results when wearing the lenses.

A given gaze direction—represented by a solid line on FIG. 1—corresponds to a position of the eye in rotation around Q' and to a point J (see FIG. 2) of the vertex sphere; the angle $\beta$ is the angle formed between the axis Q'F' and the projection of the straight line Q'J on the horizontal plane comprising the axis Q'F'; this angle appears on the scheme on FIG. 1. The angle $\alpha$ is the angle formed between the axis Q'J and the projection of the straight line Q'J on the horizontal plane comprising the axis Q'F'; this angle appears on the scheme on FIGS. 1 and 2. A given gaze view thus corresponds to a point J of the vertex sphere or to a couple $(\alpha,\beta)$. The more the value of the lowering gaze angle is positive, the more the gaze is lowering and the more the value is negative, the more the gaze is rising.

In a given gaze direction, the image of a point M in the object space, located at a given object distance, is formed between two points S and T corresponding to minimum and maximum distances JS and JT, which would be the sagittal and tangential local focal lengths. The image of a point in the object space at infinity is formed, at the point F'. The distance D corresponds to the rear frontal plane of the lens.

For each gaze direction $(\alpha,\beta)$, an optical power $P_{\alpha,\beta}$, a module of astigmatism $Ast_{\alpha,\beta}$ and an axis $Axe_{\alpha,\beta}$ of this astigmatism, and a module of resulting (also called residual or unwanted) astigmatism $Asr_{\alpha,\beta}$ are defined.

"Ergorama" is a function associating to each gaze direction the usual distance of an object point. Typically, in far vision following the primary gaze direction, the object point is at infinity. In near vision, following a gaze direction essentially corresponding to an angle $\alpha$ of the order of 35° and to an angle $\beta$ of the order of 5° in absolute value towards the nasal side, the object distance is of the order of 30 to 50 cm. For more details concerning a possible definition of an ergorama, U.S. Pat. No. 6,318,859 may be considered. This document describes an ergorama, its definition and its modeling method. For a method of the invention, points may be at infinity or not. Ergorama may be a function of the wearer's ametropia. In the context of a unifocal lens, the ergorama may be defined as a plane situated at infinity distance. Using these elements, it is possible to define a wearer optical power and astigmatism, in each gaze direction. An object point M at an object distance given by the ergorama is considered for a gaze direction $(\alpha,\beta)$. An object proximity ProxO is defined for the point M on the corresponding light ray in the object space as the inverse of the distance MJ between point M and point J of the vertex sphere:

$ProxO=1/MJ$

This enables to calculate the object proximity within a thin lens approximation for all points of the vertex sphere, which is used for the determination of the ergorama. For a real lens, the object proximity can be considered as the inverse of the distance between the object point and the front surface of the lens, on the corresponding light ray.

For the same gaze direction $(\alpha,\beta)$, the image of a point M having a given object proximity is formed between two points S and T which correspond respectively to minimal and maximal focal distances (which would be sagittal and tangential focal distances). The quantity Prox I is called image proximity of the point M:

$$ProxI = \frac{1}{2}\left(\frac{1}{JT} + \frac{1}{JS}\right)$$

By analogy with the case of a thin lens, it can therefore be defined, for a given gaze direction and for a given object proximity, i.e. for a point of the object space on the corresponding light ray, an optical power Pui as the sum of the image proximity and the object proximity.

$Pui=Pr\,oxO+Pr\,oxI$

With the same notations, an astigmatism Ast is defined for every gaze direction and for a given object proximity as:

$$Ast = \left| \frac{1}{JT} - \frac{1}{JS} \right|$$

Figure 3:
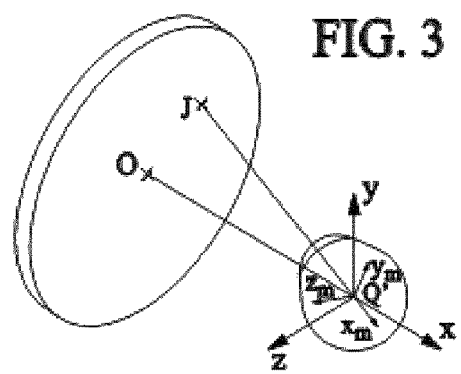

This definition corresponds to the astigmatism of a ray beam created by the lens. FIG. 3 represents a perspective view of a configuration wherein the parameters α and β are non-zero. The effect of rotation of the eye can thus be illustrated by showing a fixed frame {x, y, z} and a frame {$x_m$, $y_m$, $z_m$} linked to the eye. Frame {x, y, z} has its origin at the point Q'. The axis x is the axis Q'O and it is orientated from the lens towards the eye. The y axis is vertical and orientated upwardly. The z axis is such that the frame {x, y, z} is orthonormal and direct. The frame {$x_m$, $y_m$, $z_m$} is linked to the eye and its center is the point Q'. The $x_m$ axis corresponds to the gaze direction JQ'. Thus, for a primary gaze direction, the two frames {x, y, z} and {$x_m$, $y_m$, $z_m$} are the same. It is known that the properties for a lens may be expressed in several different ways and notably in surface and optically. A surface characterization is thus equivalent to an optical characterization. In the case of an ophthalmic lens, the characterization may be of a surface or optical kind, both characterizations enabling to describe the same object from two different points of view. Whenever the characterization of the lens is of optical kind, it refers to the ergorama-eye-lens system described above. For simplicity, the term 'lens' is used in the description but it has to be understood as the 'ergorama-eye-lens system'. The value in surface terms can be expressed with relation to points.

The values in optic terms can be expressed for gaze directions. Gaze directions are usually given by their degree of lowering and azimuth in a frame whose origin is the center of rotation of the eye. When the lens is mounted in front of the eye, a point called the fitting cross is placed before the pupil or before the eye rotation center Q' of the eye for a primary gaze direction. The primary gaze direction corresponds to the situation where a wearer is looking straight ahead. In the chosen frame, the fitting cross corresponds thus to a lowering angle α of 0° and an azimuth angle β of 0° whatever surface of the lens the fitting cross is positioned—rear surface or front surface.

The above description made with reference to FIGS. 1-3 was given for central vision. In peripheral vision, as the gaze direction is fixed, the center of the pupil is considered instead of center of rotation of the eye and peripheral ray directions are considered instead of gaze directions. When peripheral vision is considered, angle α and angle β correspond to ray directions instead of gaze directions.

Figure 4:
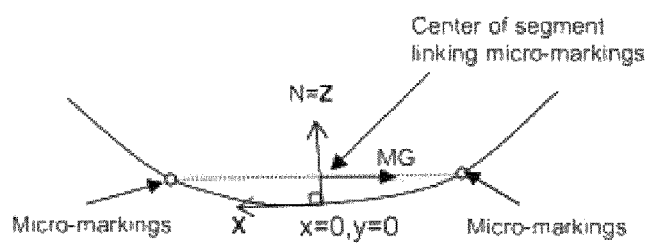
FIGS. 4 and 5 show systems of coordinates defined with respect to micro-markings, for a surface bearing micro-markings and for a surface not bearing the micro-markings respectively.
Figure 5:
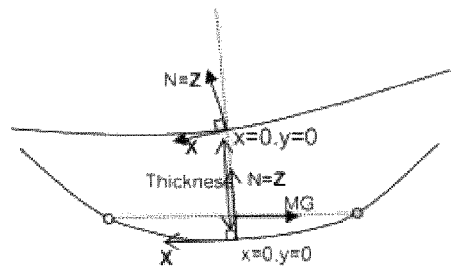

In the remainder of the description, terms like «up», «bottom», «horizontal», «vertical», «above», «below», or other words indicating relative position may be used. These terms are to be understood in the wearing conditions of the lens. Notably, the "upper" part of the lens corresponds to a negative lowering angle α<00 and the "lower" part of the lens corresponds to a positive lowering angle α>00°. Similarly, the "upper" part of the surface of a lens corresponds to a positive value along the y axis, and preferably to a value along the y axis superior to the y value corresponding to the fitting cross and the "lower" part of the surface of a lens—or of a semi-finished lens blank—corresponds to a negative value along the y axis in the frame as defined above with respect to FIGS. 4 and 5, and preferably to a value along the y axis inferior to the y value at the fitting cross.

Figure 6:
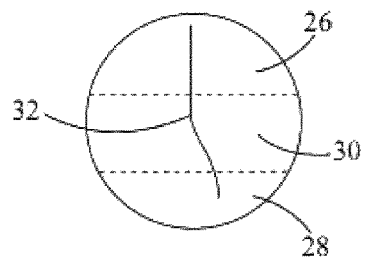
FIGS. 6 and 7 show field vision zones of a lens.
Figure 7:
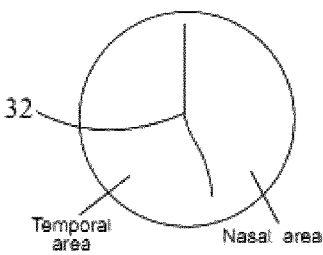

The "visualfield zones" seen through a progressive lens are known to the skilled person and are schematically illustrated in FIGS. 6 and 7. The lens comprises a far vision (distant vision) zone 26 located in the upper part of the lens, a near vision zone 28 located in the lower part of the lens and an intermediate zone 30 situated between the far vision zone 26 and the near vision zone 28. The lens also has a surface meridian line 32 belonging for example to the front surface and passing through the three zones and defining a nasal side and a temporal side.

An ophthalmic lens can be divided into two portions: a central vision zone and a peripheral vision zone. The central vision zone and the peripheral vision zone are complementary, in that taken together they allow to reconstitute the full lens. The central vision zone (resp. the peripheral vision zone) is defined with respect to a wearer, taking into account the location/orientation of the lens and the location of the centre of rotation of the eye.

"Central vision zone" of an ophthalmic lens refers to the portion of the lens through which the wearer enjoys natural vision. This corresponds to the portion of the lens intercepted by the most useful or reflex gaze directions. This central vision zone can be determined using eye tracking methods, for example with eye tracking eyeglasses.

"Peripheral vision zone" of an ophthalmic lens refers to the portion of the lens that is complementary to the central vision zone of the lens. In some embodiments, the peripheral vision zone is the portion of the lens intercepted by the set of gaze directions (αi,βi), with αi, βi expressed in degrees (°), such that SQRT(αi²+βi²)≥15°.

"Astigmatism" refers to astigmatism generated by the lens, or to residual astigmatism (unwanted astigmatism) which corresponds to the difference between the prescribed astigmatism (wearer astigmatism) and the lens-generated astigmatism; in each case, with regards to amplitude or both amplitude and axis.

A "minimum curvature" $CURV_{min}$ is defined at any point on an aspherical surface by the formula:

$$CURV_{min} = \frac{1}{R_{max}}$$

where $R_{max}$ is the local maximum radius of curvature, expressed in meters and $CURV_{min}$ is expressed in $m^{-1}$ A "maximum curvature" $CURV_{max}$ can be defined at any point on an aspheric surface by the formula:

$$CURV_{max} = \frac{1}{R_{min}}$$

where $R_{min}$ is the local minimum radius of curvature, expressed in meters and $CURV_{max}$ is expressed in $m^{-1}$.

"Minimum and maximum spheres" labeled $SPH_{min}$ and $SPH_{max}$ can be deduced according to the kind of surface considered.

When the surface considered is the object side surface (front surface), the expressions are the following:

$$SPH_{min} = (n-1) * CURV_{min} = \frac{n-1}{R_{max}} \text{ and}$$

-continued $$SPH_{max} = (n-1) * CURV_{max} = \frac{n-1}{R_{min}}$$

where n is the refractive index of the constituent material of the lens.

If the surface considered is an eyeball side surface (rear surface), the expressions are the following:

$$SPH_{min} = (1-n) * CURV_{min} = \frac{1-n}{R_{max}} \text{ and }$$

$$SPH_{max} = (1-n) * CURV_{max} = \frac{1-n}{R_{min}}$$

A "mean sphere" $SPH_{mean}$ at any point on an aspherical surface can also be defined by the formula:

$$SPH_{mean} = \frac{1}{2}(SPH_{min} + SPH_{max})$$

The expression of the mean sphere therefore depends on the surface considered:

if the surface is the object side surface, $$SPH_{mean} = \frac{n-1}{2}\left(\frac{1}{R_{min}} + \frac{1}{R_{max}}\right)$$

if the surface is an eyeball side surface, $$SPH_{mean} = \frac{1-n}{2}\left(\frac{1}{R_{min}} + \frac{1}{R_{max}}\right)$$

A cylinder CYL is also defined by the formula CYL =

$$|SPH_{max} - SPH_{min}|.$$

A "cylinder axis" $\gamma_{AX}$ is the angle of the orientation of the maximum curvature $CURV_{max}$ with relation to a reference axis and in the chosen direction of rotation. In the TABO convention, the reference axis is horizontal (the angle of this reference axis is 0°) and the direction of rotation is counterclockwise for each eye, when looking to the wearer ($0° \leq \gamma_{AX} \leq 180°$). An axis value for the cylinder axis $\gamma_{AX}$ of +45° therefore represents an axis oriented obliquely, which when looking to the wearer, extends from the quadrant located up on the right to the quadrant located down on the left.

The characteristics of any aspherical face of the lens may be expressed by means of the local mean spheres and cylinders.

A surface may thus be locally defined by a triplet constituted by the maximum sphere $SPH_{max}$, the minimum sphere $SPH_{min}$ and the cylinder axis $\gamma_{AX}$. Alternatively, the triplet may be constituted by the mean sphere $SPH_{mean}$, the cylinder CYL and the cylinder axis $\gamma_{AX}$.

"micro-markings" have been made mandatory on progressive lenses by the harmonized standard ISO 8990-2. "Temporary markings" may also be applied on at least one of the two surfaces of the lens, indicating positions of control points (reference points) on the lens, such as a control point for far-vision, a control point for near-vision, a prism reference point and a fitting cross for instance. The prism reference point PRP is considered here at the midpoint of the straight segment which connects the micro-markings. If the temporary markings are absent or have been erased, it is always possible for a skilled person to position the control points on the lens by using a mounting chart and the permanent micro-markings. Similarly, on a semi-finished lens blank, standard ISO 10322-2 requires micro-markings to be applied.

"Wearer data" (WD) designates one or more data obtained on the wearer. Wearer data generally comprise "prescription data" (PD) and/or "biometry data" (BD). Prescription data are defined above. Wearer biometry data include data pertaining to the morphology of the wearer, and typically include one or more of monocular pupillary distance, inter-pupillary distance, axial length of the eye, position of the center of rotation of the eye (CRE). Wearer data may also comprise "wearer frame data", which are data linked to the orientation of the lens when fitted to the frame and worn by the wearer, such as pantoscopic angle, wrap angle, vertex distance, distance between the center of rotation of the eye and the eye-side surface of the lens for a primary gaze direction, etc. Wearer data may also include behavior data such as head/eye gain, or posture data such as CAPE angle. Wearer data may also include mounting data which are data used for positioning the eye of the wearer with respect to the frame such as for example the interpupillary distance and the height of pupil of the eye. The wearer data are generally provided for each eye, but may also comprise binocular biometry data. Usual wearing conditions are to be understood as the position of the lens with relation to the eye of a standard wearer, notably defined by a pantoscopic angle of (−7°), a distance between the eye-side surface of the lens and the eye rotation center of 25.5 mm and a wrap angle of 7°.

"Frame data" (FD) refers to a set of one or more data characterizing an HMD frame. Said data may comprise one or more of dimensions of the lens to be fitted (length and height), inner rim shape of the frame for intended fitting of the lenses, distance between lenses (DBL), convexity of the frame, tilt angle of the frame rims, etc. Frame data may be obtained through physical measurements on an actual frame, for example using a frame reader. Frame data may also consist in a reference from a catalogue or from a set (range) of predetermined frames.

"Head-mounted device data (HMDD)" comprise "frame data" (FD) of the HMD and "display element data" (DED) relating to the location of the display element on the frame, the relative location of the display element with respect to one lens or the other, the orientation of the display element on the frame, the relative orientation of the display element with respect to one lens or the other, the geometry of the display element including shape and/or one or more dimension, the distance at which the display element is capable of displaying information content for visualization by the wearer ("virtual image display distance").

"Lens data" (LD) refers to a set of one or more data characterizing an ophthalmic lens. Said data comprise data defining one or more geometrical (surface) characteristics and/or one or more optical characteristics of the lens, such as the optical index of the lens material. Lens data may also extend to further information such as type of lens design, lens material, selection of one or more possible coatings on the lenses, etc. Such characteristics may be selected amongst the optical parameters listed above. Lens data can be in the form of an electronic file, for example a surface file. Said surface file may correspond to the finished back surface of a lens to be manufactured, for example wherein the lens is obtainable by machining the back surface of a semi-finished blank. Said surface file may alternatively correspond to the front surface of a lens to be manufactured. Said lens data may also comprise two surface files, one for each the front and the rear surface, their relative positions and the refractive index of the lens material.

"Target optical function of an ophthalmic lens" represents the global optical performance to be reached for said lens, i.e. the set of characteristics the ophthalmic lens should have. In the context of the present invention and in the remainder of the description, the term "target optical function of the lens" is used for convenience. This use is not strictly correct in so far as a target optical function is defined with respect to a given wearer, for a system of ophthalmic lens and ergorama.

The optical target function of such system is a set of target values of one or more optical parameter(s) defined in a number of given gaze directions. A target value is defined for each optical parameter in each given gaze direction. The resulting set of optical parameter target values is the target optical function.

In one aspect, a target optical function may be defined with a single optical parameter, for example optical power or unwanted astigmatism or astigmatism. In another aspect, a target optical function may be defined with two optical parameters, such as optical power and unwanted astigmatism, or optical power and astigmatism.

In another aspect, a target optical function may be defined with further optical parameters, such as a linear combination of optical power and astigmatism, or other parameters involving aberrations of higher order may be considered. The number N of optical parameters used in the target optical function depends on the desired level of precision. Indeed, the more optical parameters, the more likely the resulting lens is to satisfy the wearer's needs. However, increasing the number N of parameters may result in increasing the time taken for calculation. The choice of the number N of parameters considered will may be a trade-off between these two requirements. More details about target optical functions, optical parameter definition and optical parameter evaluation can be found in WO2011/042504.

A target optical function is used in a lens "optical optimization" process. Said process generally comprises
a step of defining a target optical function, wherein a target optical function is defined. Said target optical function is generally designed by taking into account wearer prescription data, wearer biometry data, and other factors such as wearer behavior, including head/eye behavior;
a step of defining an initial lens;
a step of defining a current lens, with a current optical function being defined for said current lens, the current lens being initially defined as the initial lens;
one or more steps of optical optimization for minimizing the difference between the current optical function and the target optical function, for example by modification of the current lens.

From the above, the skilled person understands that "current optical function" or an "intermediate optical function" is defined for a given lens. Said current or intermediate optical function of a current or intermediate lens is the set of values reached by said lens for the same optical parameter(s) in the same gaze directions as in the target optical function. The aim of the optical optimization is to minimize the differences between the current optical function and the target optical function. The optimization may be performed by iteration, for example by using a ray-tracing method. An example of lens optical optimization using target definition is described in EP-A-0 990 939.

DETAILED DESCRIPTION OF THE INVENTION

Head-Mounted Display Device

Head-mounted display devices (HMD) are known in the art. Such devices are to be worn on or about the head of a wearer, including helmet-mounted displays, optical head-mounted displays, head-worn displays and the like. They include a display element for displaying (computer-generated) information content for visualization by the wearer. The HMD can provide for the display of computer-generated information content, advantageously for the visualization of both computer-generated information content ('virtual display') and of a 'real-life' (natural) vision field. The HMD may be monocular (single eye) or binocular (both eyes). The HMD of the invention can take various forms, including spectacles, masks such as skiing or diving masks, goggles, etc. The HMD may comprise one or more lenses.

According to the invention, the HMD is such that it comprises an ophthalmic lens having an object-side surface (S1) and an eye-side surface (S2), and a display element.

The lens and the display element are arranged in such a way that the display element is arranged to display information content by emitting light towards the eye of the wearer, in such a way that the light emitted by the display element is refracted by said object-side surface (S1) and then by said eye-side surface (S2) of the ophthalmic lens before reaching the wearer's eye. The display element is thus arranged in a configuration such that, when the wearer wears the head-mounted display device, the ophthalmic lens is located between the display element and the eye/face of the wearer. This is by contrast to head-mounted devices wherein the display element is embedded within the bulk of a lens.

Lens Supply System

The present invention relates to a system and to methods for providing ophthalmic lenses, intended to be worn by an ametropic wearer, wherein the lens is intended to and designed to be fitted onto a head-mounted device.

In aspect, the present invention provides an ophthalmic lens supply system for providing an ophthalmic lens intended for a wearer, wherein:
the ophthalmic lens has an object-side surface and an eye-side surface, wherein the ophthalmic lens is arranged to correct the ametropia of one eye of the wearer, and the ophthalmic lens is intended to be fitted onto a head-mounted device,
the head-mounted device is provided with a display element, wherein the display element is arranged to display information content by emitting light towards the eye of the wearer, in such a way that the light emitted by the display element is refracted by said object-side surface and then by said eye-side surface of the ophthalmic lens before reaching the wearer's eye.

Advantageously, the lens provides improved visual comfort for the wearer in both natural vision and virtual vision. The lens is intended to correct the wearer's ametropia, and it can be selected from single vision lenses and progressive addition lenses.

According to the invention, the supply system comprises:
first processing means (PM1) configured for placing an order of an ophthalmic lens, wherein said first processing means (PM1) are located at a lens ordering side (LOS) and wherein said first processing means (PM1) comprise:
first inputting means (IM1) configured for inputting wearer data (WD), wherein said wearer data (WD) can comprise prescription data (PD) relating to said eye, such as prescribed optical power (P) and/or prescribed astigmatism (A), and biometry data, and
second inputting means (IM2) configured for inputting head-mounted device data (HMDD),
wherein said head-mounted device data (HMDD) can comprise display element data (DED) such as data pertaining to the location, orientation and geometry of the display element, or the virtual display distance, namely the distance at which the information content is displayed by the display element for visualization by the wearer;
second processing means (PM2) configured to process lens data (LD) based upon wearer data (WD) and head-mounted device data (HMDD), such that the ophthalmic lens comprises:
a central vision zone arranged to correct the ametropia of said eye of the wearer, so as to provide acuity for natural vision by the wearer, and
a peripheral vision zone comprising an optical system arranged to correct the ametropia of said eye of the wearer, so as to provide acuity for virtual vision, by the wearer, of information content displayed by the display element;
wherein said second processing means are located at a lens determination side (LDS) and wherein said second processing means (PM2) comprise outputting means (OM) configured for outputting said lens data (LD), and
first transmission means (TM1) configured for transmitting said wearer data (WD) and head-mounted device data (HMDD), from said first processing means (PM1) to said second processing means (PM2); and and optionally wherein the supply system further comprises:
manufacturing means (MM1, MM2) configured for manufacturing an ophthalmic lens based upon lens data (LD), wherein said manufacturing means (MM1, MM2) are located at a lens manufacturing side (LMS), and
second transmission means (TM2) configured for transmitting said lens data (LD) from said second processing means (PM2) to said manufacturing means (MM1, MM2).

Advantageously according to the invention, the processing means are configured to determine the optical system by taking into account the relationship between the location of the center of rotation of the eye, the location and orientation of the lens with respect to the eye, and the location, orientation and geometry of the display element with respect to the eye and the lens.

The lens ordering side (LOS) is typically at the premises of an eye care professional or optician where lenses are ordered for wearers (customers).

The lens determination side (LDS) is equipped with processing means that may advantageously be arranged for performing any one of the lens determination methods as described therein or may advantageously comprise a computer program product as described thereafter.

Each of the above imputing means (IM) may be any inputting means suitable for the input of the relevant data. Said inputting means are preferably selected for facilitated interface (e.g. may be used in connection with displaying means), and may be a keyboard from a computer such as a PC or laptop, tablet, handset, terminal, remote, etc.

The system of the invention may further comprise inputting means (IM3) configured for the input of frame data (FD) wherein said frame is the frame intended for fitting the lens, and/or inputting means (IM4) configured for the input of wearer biometry data (BD).

According to the invention, the inputting means (IM1-IM4) may be distinct of each other or (partially or fully) combined. For example, one may have (IM1)=(IM2) or (IM1)=(IM2)=(IM4), etc.

The lens manufacturing side is generally located in an optical lab, namely a place equipped with manufacturing means for manufacturing lenses following lens orders, based upon lens data previously obtained or generated.

Lens manufacturing means (MM, MM1, MM2) are known in the art, and the skilled person is familiar with suitable manufacturing means. Said manufacturing means may include one or more of surfacing including digital surfacing, polishing, edging means, etc. The lens manufacturing side (LMS) may comprise a combination of manufacturing means, including several different surfacing means, and/or several polishing means, etc.

The lens manufacturing side may further comprise inputting means configured for receiving the information from said second processing means and further transmit the information to the relevant manufacturing means.

The lens manufacturing side (LMS) may further comprise third processing means (PM3). Third processing means may send further data, for example relative to manufacturing means, such as the designation (selection) of specific manufacturing means or manufacturing rules to be used with specific manufacturing means, for example the selection of a given manufacturing protocol or the identification of specific manufacturing parameters regarding the settings of specific manufacturing means.

In the system of the invention, the transmitting means (TM1, TM2) may comprise all types of suitable transmission means. The person skilled in the art is familiar with suitable transmitting means useful in the field of lens supply systems. Suitable means include electronic communications, such as by internet connections, for example via one or more servers, e-mail communication, and the like.

In one aspect of the invention, the first and/or the second and/or the third processing means (PM1, PM2, PM3) may be a computer entity and may comprise a memory (MEM). The computer entities may be connected to each other through one or more servers. Said servers may comprise storing means in the form of a memory.

Memories are known in the art and the skilled person is familiar with memories that that configured for implementation within a lens supply system. The memory may be configured for storing data, such as: input data, output data, intermediate data (such as intermediate computation results). The memory may be useful as a working memory and/or to store sequence of instructions. The memory may be provided in one or more storing elements/means, and may be part of a server.

Figure 13:
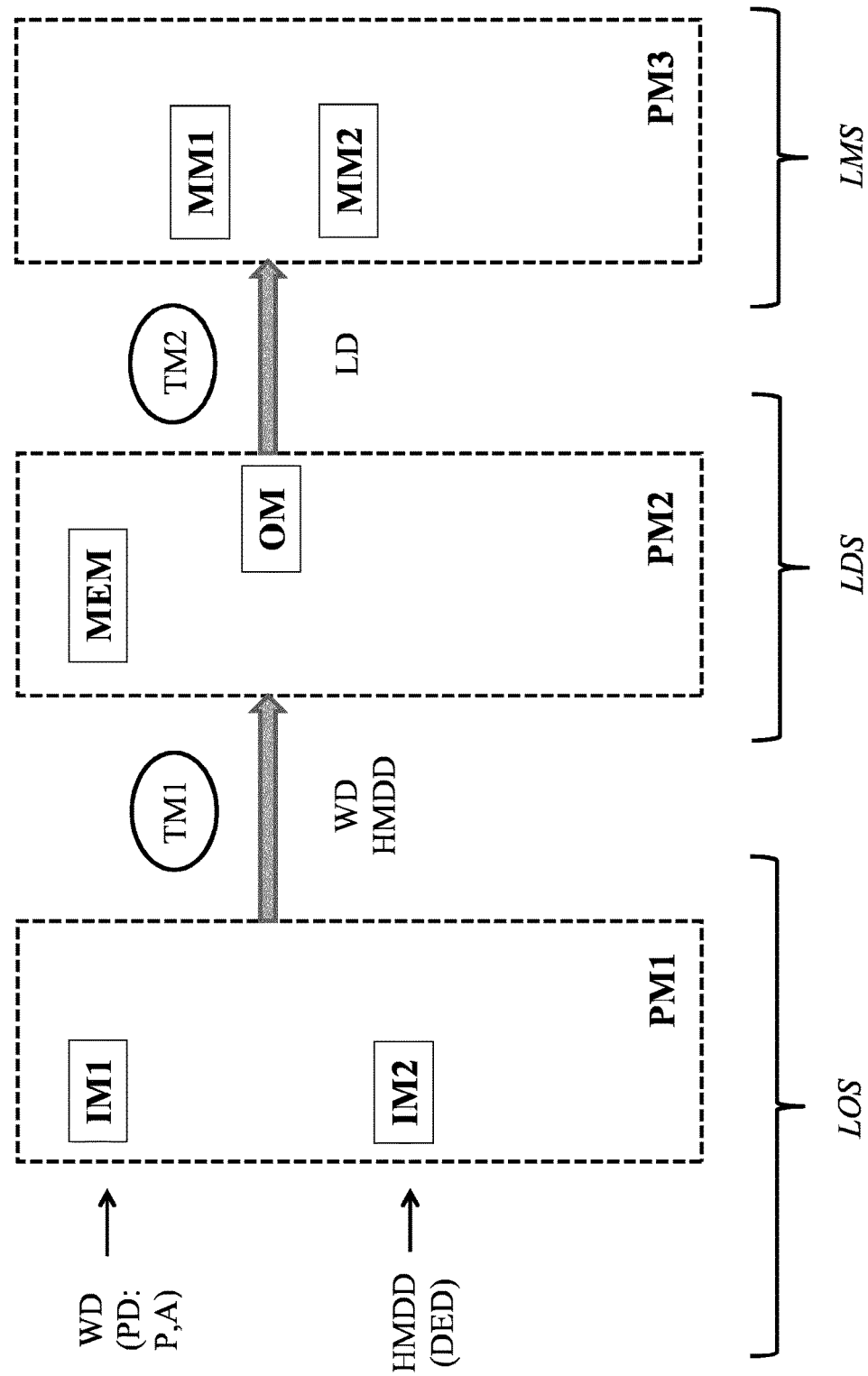
FIG. 13 illustrates schematically an exemplary ophthalmic lens supply system of the invention.

An exemplary ophthalmic lens supply system of the invention is represented schematically at FIG. 13.

Method for Lens Design and Optimization

In another aspect, the present invention provides a computer-implemented method for the determination of an ophthalmic lens (L) intended for a wearer, wherein:

the ophthalmic lens (L) has an object-side surface (S1) and an eye-side surface (S2), wherein the ophthalmic lens (L) is arranged to correct the ametropia of one eye (E) of the wearer, and the ophthalmic lens is intended to be fitted onto a head-mounted device (HMD), the head-mounted device (HMD) is intended to be worn by the wearer;

and wherein the ophthalmic lens comprises:

a central vision zone arranged to correct the ametropia of said eye of the wearer, so as to provide acuity for natural vision by the wearer, and a peripheral vision zone comprising an optical system arranged to correct the ametropia of said eye of the wearer, so as to provide acuity for virtual vision, by the wearer, of information content displayed by the display element;

the head-mounted device (HMD) is provided with a display element (DE), wherein the display element (DE), when the head-mounted device (HMD) is worn by the wearer, is arranged to display information content by emitting light towards the eye (E) of the wearer, in such a way that the light emitted by the display element is refracted by a first sub-part (SP1) of the object-side surface (S1) and then by a second sub-part (SP2) of the eye-side surface (S2) of the ophthalmic lens before reaching the wearer's eye; and wherein:

said second sub-part (SP2) comprises a geometrical barycenter located on the eye-side surface (S2) of the lens in a gaze direction intercepting the peripheral vision zone;

said second sub-part (SP2) can be defined in an angular system of coordinates $(\alpha,\beta)$ centered on the center of rotation of the eye, $\alpha$ being the lowering angle and $\beta$ being the azimuth angle;

the optical system comprises a zone of stabilized optical performance, wherein said zone of stabilized optical performance is defined by first sub-part (SP1) and second sub-part (SP2);

preferably, said zone of stabilized optical performance is arranged so that, under usual wearing conditions, said second sub-part (SP2) can be inscribed within a square of the eye-side surface (S2) having a length of side of 12-30° when measured as a distance in said $(\alpha,\beta)$ coordinates, with $\alpha,\beta$ expressed in degrees (°), wherein the distance between two points M, N is calculated by SQRT $((\alpha_M-\alpha_N)^2+((\beta_M-\beta_N)^2)$, wherein SQRT is the square root function.

The method provides for the calculation of the lens, i.e. determining its design so that it can be then manufactured.

According to the invention, the method for the determination of an ophthalmic lens comprises the steps of:

(i) providing wearer data (WD) including prescription data (PD) relating to the eye (E) of the wearer;
(ii) providing data relating to the head-mounted device (HMDD), including display element data (DED),
(iii) based upon the data of step (ii), defining the location, on the lens, of said zone of stabilized optical performance; optionally, determining a closed angular aperture contour C of said zone of stabilized optical performance, that can be defined in the $(\alpha,\beta)$ angular system of coordinates, $\alpha$ being the eye lowering angle and $\beta$ being the eye azimuth angle (iv) determining the ophthalmic lens (L) by:
taking into account the data of step (i), and
determining, by way of optical or surface definition, the zone of stabilized optical performance.

For example, step (iii) may be performed using ray-tracing methods, eye tracking methods, for example using an eye tracker such as eye-tracking eyeglasses.

Advantageously, step (iii) allows to identify (delimit) a zone of the lens that is useful for virtual vision, namely the visualization by the wearer of information content displayed by the display element. This zone can then be optimized in its optical and/or surface design for this specific purpose.

The method of the invention is advantageous in that it results in a zone of stabilized performance in the lens. Accordingly, this allows to stabilize optical defects so that the lens determined according to the invention can be used with a variety of displays, independently of the exact specification of said displays.

In this respect, in all methods and devices of the present invention, the zone of stabilized optical performance can be such that the optical power in that zone differs from the optical power for 'natural' vision. Conversely, in said methods and devices, said zone of stabilized optical performance can be such that the optical power in that zone is the same as the one for 'natural vision'.

Method for Lens Design by Target-Mediated Optical Optimization

In some embodiments, step (iv) can comprise a step of determining the ophthalmic lens (L) by performing an optical optimization. For example step (iv) can comprise the steps of:

(a) optionally, selecting an ergorama, as a function associating a visualization distance to a gaze direction $(\alpha,\beta)$;
(b) defining a target optical function, as a function of gaze directions $(\alpha_i,\beta_i)$, for said ophthalmic lens (L);
(c) performing an optimization by:
selecting an initial lens;
defining a current lens, a current optical function being defined for the current lens, the current lens being initially defined as the initial lens;
carrying out an optical optimization for minimizing the difference between the current optical function and the target optical function, for example with a cost or merit function;

In the definition of the ergorama, it is possible to take into account the virtual image display distance, namely the distance at which the information content is displayed by the display element for visualization by the wearer. This distance can thus be used for defining the relevant properties of the ergorama in the corresponding zone of the lens. The difference between the current optical function and the target optical function may be calculated with a least square method, for example Gauss-Newton, or Levenberg-Marquardt, as described in «Numerical Optimization», Bonnas et al., Springer 2003.

In some embodiments, step (iv) can comprise a step of determining the ophthalmic lens (L) by performing an optical optimization, wherein at step (iv):

step (b) comprises setting target values within the zone of stabilized optical performance; and/or
the optical optimization of step (c) comprises optimizing visual performance within the zone of stabilized optical performance, for example by defining the cost or merit function with weight values for various gaze directions and by selecting higher values of weight coefficients in one or more gaze directions included within the zone of stabilized optical performance.

Advantageously according to the invention, such step (iv) results in the specific optimization of the zone for informative (virtual) vision. This optimization allows to favor optical target criteria in the zone of interest.

Further, the definition of the target optical function of step (b) can be such that it provides for an improved optical performance in the zone of stabilized optical performance. For example, the target optical function may take into account one or more or all of the following criteria regarding the zone of stabilized optical performance and its optical properties:

- it can be inscribed within a square having a length of side of 12-30° when measured as a distance in said $(\alpha,\beta)$ coordinates, with a, $\beta$ expressed in degrees (°);
- its geometrical barycenter is located at a distance of at least 15° from the optical center of the lens as measured in said $(\alpha,\beta)$ coordinates; i.e. for the geometrical barycenter located at $(\alpha_B, \beta_B)$ in said $(\alpha,\beta)$ coordinates, SQRT $(\alpha_B^2+\beta_B^2) \geq 15°$, wherein SQRT is the square root function;
- it is stabilized in terms of optical power and unwanted astigmatism, so that over the entire zone, optical power and unwanted astigmatism are essentially of constant value, for example of constant value+/−0.12 D or of constant value of +/−0.06 D; optical power can refer to a mean optical power for all axes;
- said constant value of optical power $P_S$ is essentially equal to the value of optical power at the optical center of the lens $P_C$, for example ABS $(P_S-P_C) \leq 0.25$ D or $\leq 0.12$ D, where ABS denotes absolute value; and
- said constant value of unwanted astigmatism $Asr_S$ is essentially equal to the value of optical power at the optical center of the lens $Asr_S$, for example ABS $(Asr_S-Asr_C) \leq 0.25$ D or $\leq 0.12$ D, where ABS denotes absolute value.

These features are described below in more details.

Method for Lens Design by Surface Combination

In some embodiments, step (iv) can comprise a step of surface calculation by surface combining, by addition and/or subtraction of one or more surfaces so as to obtain the surface definition of the object-side surface (S1) and/or of the eye-side surface (S2) of the ophthalmic lens (L).

The surfaces are a two-dimensional locus of points located in a three-dimensional space showing varying 'altitude' (heights) for different points in the surface. They can be defined by mathematical functions z=f(x,y) in a Cartesian system of coordinates, wherein for each point of the surface, the height (z) is the altitude defined for a point of (x,y) planar coordinates. Predefined surfaces can be used to provide for a surface 'library', with various surface profiles corresponding to various surface properties.

These predefined surfaces (some spherical, some not) can then be combined with each other by way of addition and/or subtraction so as to define S1 and/or S2. When surfaces are combined, they may be weighted prior to the addition or subtraction.

For example, step (iv) can comprise the steps of:
providing a set of surfaces, each surface being suitable for given prescription data;
selecting an addition or subtraction surface, wherein an addition or subtraction surface is defined as a lens surface with a nil value over the lens, except in at least one portion of the zone of stabilized optical performance, wherein on said portion the addition or subtraction surface is not nil, for example it comprises a spherical, aspherical or toric surface;
combining one surface from said set with one or more addition surface/s or with one or more subtraction surface/s,
preferably two addition or subtraction surfaces or more are selected and weighted, before being combined;
so as to reach the desired optical performance for the zone of stabilized optical performance.

Such step (iv) allows to specifically design the zone of stabilized optical performance, namely in such a way that it provides for a stabilized optical performance in said zone. This improves wearer comfort for virtual vision.

For example, S1 may be defined as a spherical surface, and S2 may result from the combination of a first weighted spherical surface and a second weighted surface that is toric in the zone of stabilized optical performance. In another example, S1 may be the combination of a first weighted spherical surface with another second weighted surface that is nil except in the zone of stabilized optical performance, wherein it is spherical, while S2 may be spherical. All such possible combinations are envisioned (with weighted and unweighted surfaces). Further, the skilled person recognizes that S1 may be the front (object-side) surface of the lens, or it may be the rear (eye-side) surface of the lens. First and second used weights may be determined by an optimization method.

Advantageously according to the invention, surface combination may be performed with (pre-) optimized surfaces. This unexpectedly allows to reach the optical performance as recited in the claims, and in particular meeting criteria C1, C2 and C3 as described herein and detailed in the example.

Method for Lens Design and Optimization: Multiple Zones of Stabilized Optical Performance In some embodiments, the method of the invention may be repeated for at least two possible locations and/or geometries of the zones of stabilized optical performance. This is very advantageous for situations wherein the HMD is configured so that the display element may assume two or more distinct configurations on the HMD frame.

Advantageously, the optimization method of the invention can be carried out for the two (or more) different configurations, so that visual comfort is achieved for virtual vision in both configurations of the device. The two configurations can be advantageously selected as two 'extreme' locations and/or orientations of the display element.

Thus, in some embodiments,
the display element (DE) is configured so that the wearer may set up the location and/or orientation thereof in at least two different configurations,
steps (ii) and (iii) are performed for each configuration, so as to determine the respective location of the respective zones of stabilized optical performance, and
step (iv) comprises determining the respective zones of stabilized optical performance.

Method for Lens Provision and Manufacture

In another aspect, the present invention provides a method for the provision or manufacture of an ophthalmic lens intended to be worn by a wearer, comprising the computer-implemented method for lens determination as described herein.

Computer Program

In another aspect, the present invention provides a (non-transitory) computer program comprising one or more stored sequence/s of instructions that is accessible to a processor and which, when executed by the processor, causes the processor to carry out the steps of the method of the invention.

In another aspect, the present invention provides a (non-transitory) computer readable medium carrying out one or more sequence/s of instructions of said computer program product.

Ophthalmic Lens Intended for an Ametropic Wearer

In another aspect, the present invention provides an ophthalmic lens intended for one ametropic eye of a wearer, wherein:

the ophthalmic lens has an object-side surface (S1) and an eye-side surface (S2);

the ophthalmic lens is arranged to correct the ametropia of the eye of the wearer;

the ophthalmic lens is intended to be fitted onto a head-mounted device provided with a display element, and the ophthalmic lens comprises:

a central vision zone arranged to correct the ametropia of said eye of the wearer, so as to provide acuity for natural vision by the wearer, and a peripheral vision zone comprising an optical system arranged to correct the ametropia of said eye of the wearer, so as to provide acuity for virtual vision, by the wearer, of information content displayed by the display element.

In some embodiments, the ophthalmic lens is such that:

the display element is arranged to display information content by emitting light towards the eye of the wearer, in such a way that the light emitted by the display element is refracted by a first sub-part (SP1) of the object-side surface (S1) and then by a second sub-part (SP2) of the eye-side surface (S2) of the ophthalmic lens before reaching the wearer's eye;

said second sub-part (SP2) comprises a geometrical barycenter located on the eye-side surface (S2) of the lens in a gaze direction intercepting the peripheral vision zone;

said second sub-part (SP2) can be defined in an angular system of coordinates $(\alpha,\beta)$ centered on the center of rotation of the eye, $\alpha$ being the lowering angle and $\beta$ being the azimuth angle, the optical system comprises a zone of stabilized optical performance, wherein said zone of stabilized optical performance is defined by first sub-part (SP1) and second sub-part (SP2);

preferably, said zone of stabilized optical performance is arranged so that, under usual wearing conditions, said second sub-part (SP2) can be inscribed within a square of the eye-side surface (S2) having a length of side of 12-30° when measured as a distance in said $(\alpha,\beta)$ coordinates, with $\alpha,\beta$ expressed in degrees (°), wherein the distance between two points M, N is calculated by SQRT $((\alpha_M-\alpha_N)^2+(\beta_M-\beta_N)^2)$, wherein SQRT is the square root function.

In one aspect, the lens of the invention is such that:

the ophthalmic lens is a single-vision lens intended to be fitted onto a head-mounted device, and in the central vision zone, the ophthalmic lens comprises a first optical center on the object-side surface (S1) and a second optical center on the eye-side surface (S2); hereinafter, the second optical center is named "optical center". The optical center is the PRP as defined above.

under usual wearing conditions, the peripheral vision zone is defined as the portion of the lens intercepted by the set of gaze directions $(\alpha i,\beta i)$, with $\alpha i$, $\beta i$ expressed in degrees (°), such that SQRT$(\alpha i^2+\beta i^2)\geq 15°$. Thus the peripheral vision zone is defined as the set of gaze directions which are 'located' at a distance of 15° or more from the optical center of the lens, with the distance measured in $(\alpha,\beta)$ coordinates.

This is advantageous in that it minimizes the impact on central vision, and thus essentially does not impact central (natural) vision of the wearer.

In one aspect, the lens of the invention is such that, under usual wearing conditions:

said zone of stabilized optical performance is stabilized in terms of optical power and/or unwanted astigmatism, so that over the entire zone, optical power and/or unwanted astigmatism are essentially of constant value, for example of constant value+/−0.12 D or of constant value of +/−0.06 D; optical power can refer to a mean optical power for all axes;

said constant value of optical power $P_S$ is essentially equal to the value of optical power at the optical center of the lens $P_C$, for example ABS $(P_S-P_C)\leq 0.25$ D or $\leq 0.12$ D, where ABS denotes absolute value; and/or said constant value of unwanted astigmatism $Asr_S$ is essentially equal to the value of unwanted astigmatism at the optical center of the lens $Asr_C$, for example ABS $(Asr_S-Asr_C)\leq 0.25$ D or $\leq 0.12$ D, where ABS denotes absolute value.

In the above definitions, the zone of stabilized optical performance is characterized in terms of optical power, but the skilled person recognizes that the power can also be expressed in terms of values of sphere and/or cylinder.

The recitation "the zone of stabilized optical performance is inscribed in a square" indicates that said zone can be entirely fitted into such square. It is not required that a minimal number of points of the contour of the zone coincide with the contour of the square. It is however required that any point of the contour or surface area of the zone be on the contour of the square or within the square. In terms of surface are, this indicates that the surface area of the zone can be of less than 30×30°, or less than 20×20°.

In some embodiments, the single-vision lens is intended for absolute values of lens optical power of at least 2.00, preferably of at least 3.00 D and/or for values of lens astigmatism of at least 2.00, preferably of at least 3.00 D In some embodiments, the single-vision lens is intended for absolute values of prescribed power of at least 2.00, preferably of at least 3.00 D and/or for values of prescribed astigmatism of at least 2.00, preferably of at least 3.00 D.

In some embodiments, the single-vision lens is such that the absolute values of optical power of at least 2.00, preferably of at least 3.00 D and/or of astigmatism of at least 2.00, preferably of at least 3.00 D, wherein said values are measured at the optical center of the lens.

The specific lens designs of the present invention surprisingly exhibit improved optical performance for virtual vision, while not impairing real/natural vision. Indeed, the designs of the present invention are very counterintuitive to the skilled person who is familiar with conventional optical designs for single vision (SV) lenses. In particular, according to the invention, improved optical performance can be obtained by selecting a specific optical design in a specific and delimited location of peripheral vision zone of said SV lens. However, as is known in the art, conventional SV lenses have essentially a design with symmetry of rotation, and it was unexpectedly found that an asymmetric design still provides for a comfortable vision experience for the wearer, while achieving optimized visual performance in both real vision and virtual vision.

According to the invention, the zone of stabilized performance may have any shape. In particular, sub-parts SP1 and/or SP2 may have any shape, and can be a tetragon (quadrilateral), a square, a rectangle, a trapezium, a parallelogram, etc. and can be optionally deformed, flattened or elongated. The zone of stabilized performance may be defined by its contour, namely a closed contour. Said contour may be defined in said system of coordinates $(\alpha,\beta)$.

Advantageously according to the invention, the location, size and/or orientation of the stabilized zone are optimized for wearer comfort in virtual vision.

Further advantageously according to the invention, the lens is suitable for use with the display element arranged on the object-side of the lens. In accordance with the invention, the stabilized zone can be determined so as to be slightly larger than what is strictly required in order for the wearer to visualize the entire information content displayed by the display element. Accordingly, the lens and the method of the invention can be used for various wearer morphologies and/or for various positions of the display element with respect to the lens. Thus, in some embodiments, the invention provides a lens suitable in so-called "over-the-counter reading glasses" (ready-made reading glasses): the lens can advantageously provide visual acuity for both natural vision and virtual vision, wherein said lens is compatible with various positioning and/orientations of the display element that provides said virtual vision. Thus, the lens is advantageous in that it can be paired with various display elements, so that the display and the lens can be sourced separately.

The zone of stabilized optical performance can be located in the peripheral vision zone, and exhibit the desired optical properties so as to correct the wearer's ametropia. Said zone is located away from the optical center of the lens so as not to impair central vision (essentially, useful for natural/real vision), while still providing optimal vision of the virtual display.

Advantageously according to the invention, the zone of stabilized optical performance is a zone wherein some optical parameters are stabilized, i.e. have a value distribution that "plateaus". This indicates that the values are essentially constant over the plateau, +/−a limited error/accepted deviated. The skilled person can determine acceptable deviation values depending on the nature of the optical parameter.

In some embodiments, the lens is such that, under usual wearing conditions, said second sub-part (SP2) or the periphery of said second sub-part (SP2) contain at least one point at which $\beta \geq 45°$, with $\beta$ expressed in degrees wherein $\beta$ is defined for each point as the absolute value of the acute angle between:
  the direction of the gradient of unwanted astigmatism at said point, and
  the direction of a straight line joining said point to the optical center of the lens;
the periphery of said second sub-part (SP2) is defined as the set of points of the eye-side surface (S) located at a distance of 5° or less from said second sub-part (SP2), wherein the distance is measured in said $(\alpha,\beta)$ coordinates, wherein the distance between two points M, N is calculated by SQRT $((\alpha_M-\beta_N)^2+(\beta_M-\beta_N)^2)$, wherein SQRT is the square root function,
preferably wherein:
$\theta \geq 70°$, and
optionally, the geometrical barycenter of said second sub-part (SP2) is located at $(\alpha_B, \beta_B)$ in said $(\alpha,\beta)$ coordinates, with ABS$(\alpha_B) \leq 10°$ or ABS$(\beta_B) \leq 10°$, wherein ABS denotes absolute value.

As is known in the art, the direction of the gradient is perpendicular to the iso-value line of interest. Such lens surprisingly provides improved visual comfort. This is unexpected since, in conventional SV lenses, the gradients are essentially directed towards the optical center of the lens. By contrast, according to the invention, stabilized optical performance is achieved by radically non-radial gradient directions for optical parameters such as optical power and unwanted astigmatism. Such specific design is very contra-intuitive for a SV lens, and surprisingly provides optimized virtual vision, while still retaining visual comfort in the central vision zone of the lens (natural vision).

In some embodiments, said second sub-part (SP2) or the periphery of said second sub-part (SP2) contain at least two, at least five or at least ten points at which $\theta \geq 45°$.

In some embodiments, ABS$(\alpha_B) \leq 10°$ or ABS$(\beta_B) \leq 10°$.
In some embodiments, ABS$(\alpha_B) \leq 8°$ or ABS$(\beta_B) \leq 8°$.
In some embodiments, ABS$(\alpha_B) \leq 5°$ or ABS$(\beta_B) \leq 5°$.

Thus, according to the invention, the zone of stabilized optical performance can be located in the periphery of the lens and in the vicinity of one of the lens axis.

In some embodiments, said second sub-part (SP2) or the periphery of said second sub-part (SP2) contains at least one point at which, under usual wearing conditions:
  the module of the gradient of optical power is at least five times the value of the average module of the gradient of optical power, and/or
  the module of the gradient of unwanted astigmatism is at least five times the value of the average module of the gradient of unwanted astigmatism,
  wherein the average module of the gradient of optical power, respectively the average module of unwanted astigmatism, is determined:
  along a first referencing line of the lens passing by the geometrical barycenter of said second sub-part (SP2) and the optical center of the lens, or
  along a second referencing line of the lens that is perpendicular to the first referencing line and passing by the optical center of the lens;
  and preferably is determined
  along a first segment of the first referencing line, or
  along a second segment of the second referencing line, wherein said first and second segment are both centered on the optical center of the lens and have both a same length (SL), wherein said length (SL) is smaller than twice the greatest distance separating the optical center of the lens from any point of said second sub-part (SP2).

Again, such features unexpectedly lead to improved visual comfort in the zone for virtual vision. Such designs are non-conventional for SV lenses, wherein the designs are selected so as to avoid steep variations of the optical parameters over the lens. By contrast, according to the present invention, significant variations in the module of the gradient for an optical parameter can be implemented in the zone of stabilized optical performance or in its periphery.

Uses

In another aspect, the present invention provides the use of any ophthalmic lens described herein, for improving the visual comfort of a wearer equipped with a head-mounted display device.

Head-Mounted Display Device

In another aspect, the present invention provides a head-mounted device intended to be worn by a wearer, comprising:
  an ophthalmic lens,
  wherein the ophthalmic lens has an object-side surface (S1) and an eye-side surface (S2);

wherein the ophthalmic lens is arranged to correct the ametropia of one eye of the wearer, so as to provide acuity for natural vision by the wearer;

a display element, wherein the display element is arranged to display information content by emitting light towards the eye of the wearer, in such a way that the light emitted by the display element is refracted by said object-side surface (S1) and then by said eye-side surface (S2) of the ophthalmic lens before reaching the wearer's eye.

As indicated above, this indicates that the HMD is such that the lens is situated between the wearer eye and the display element. This is by contrast to HMDs wherein the display element is embedded within the bulk of the lens.

According to the invention, the ophthalmic lens comprises an optical system arranged to correct the ametropia of said eye of the wearer, so as to provide acuity for virtual vision, by the wearer, of information content displayed by the display element.

As explained above, said zone may be determined by ray tracing. It may be defined by its contour, which is a closed contour, and which can be defined in the ($\alpha$,$\beta$) system of coordinates.

In some embodiments, the head-mounted device is such that the display element is arranged to display information content by emitting light towards the eye of the wearer, in such a way that the light emitted by the display element is refracted by a first sub-part (SP1) of the object-side surface (S1) and then by a second sub-part (SP2) of the eye-side surface (S2) of the ophthalmic lens before reaching the wearer's eye, and the optical system comprises a zone of stabilized optical performance, wherein said zone of stabilized optical performance is defined by first sub-part (SP1) and second sub-part (SP2).

Advantageously according to the invention, the optical system comprises a zone of stabilized optical performance, wherein said zone of stabilized optical performance is defined by first sub-part (SP1) and second sub-part (SP2). The optical system and the zone of stabilized optical performance can be determined using ray tracing techniques.

The display element is configured to emit light that is refracted by the object-side surface and then is refracted by the eye-side surface, before reaching the wearer eye.

Ray tracing allows determining the relevant sub-part (sub-area) of the object-side surface and of the eye-side surface. This determination can involve the determination of the contour of said subparts, so as to define the zone of stabilized optical performance according to the invention.

In some embodiments, the present invention provides a head-mounted device, wherein the ophthalmic lens is an ophthalmic lens as described herein or a progressive addition lens.

Distance at which the Information Content is Displayed

According to the invention, in some embodiments, the display element may be configured for displaying information content display at infinite distance, whereas in other embodiments, the display element may be configured for displaying information content at a finite distance. For example, the display element may be configured for displaying the information content at a distance of 0.8 to 4 m, for instance a distance of 0.8 to 1 m.

Such finite values of distances for virtual visualization are advantageous in terms of visual comfort for the wearer. This is because in a situation of dual vision (natural vision and virtual vision), the wearer switches between the two visions and/or visualizes a field that is a superimposition of the two visions. Finite values of virtual visualization distances result in minimizing accommodation efforts required from the wearer for acuity, and thus minimizes visual fatigue.

The invention is illustrated by the following non-limiting examples.

EXAMPLES

Example 1: Head-Mounted Display Device

Figure 8:
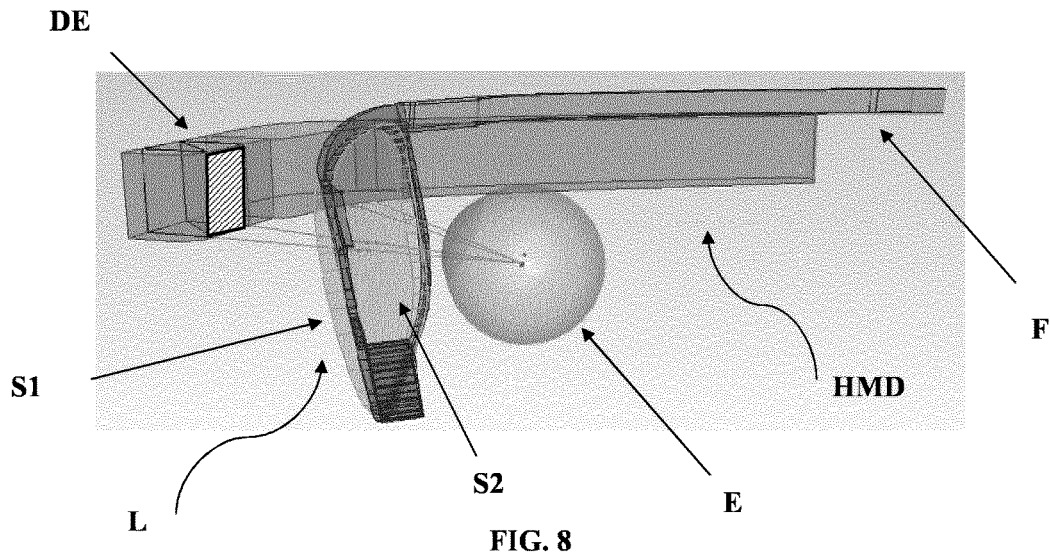
FIGS. 8-12 illustrate HMD devices and lenses of the invention.
Figure 9:
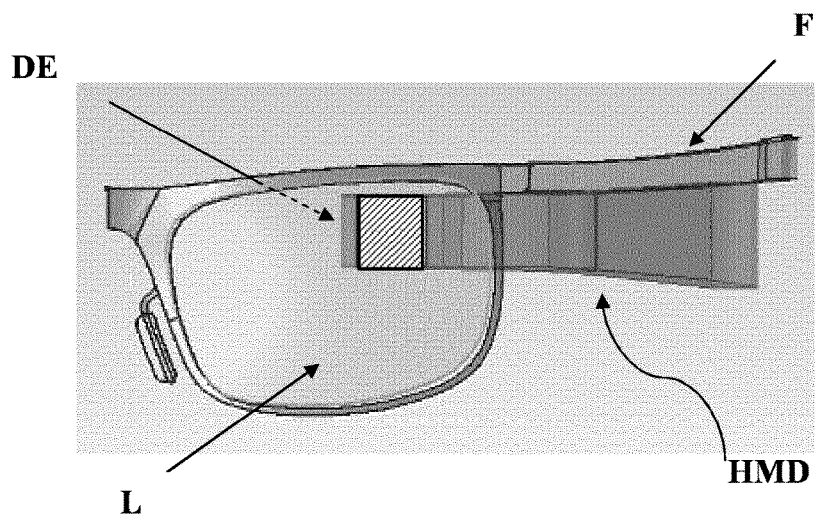

FIGS. 8-9 illustrate an exemplary HMD. The HMD comprises a frame F and a display element DE. It also comprises a lens L with object-side surface S1 and eye-side surface S2. The figures show the relative position of the eye E, the lens L and the display element DE.

Figure 10:
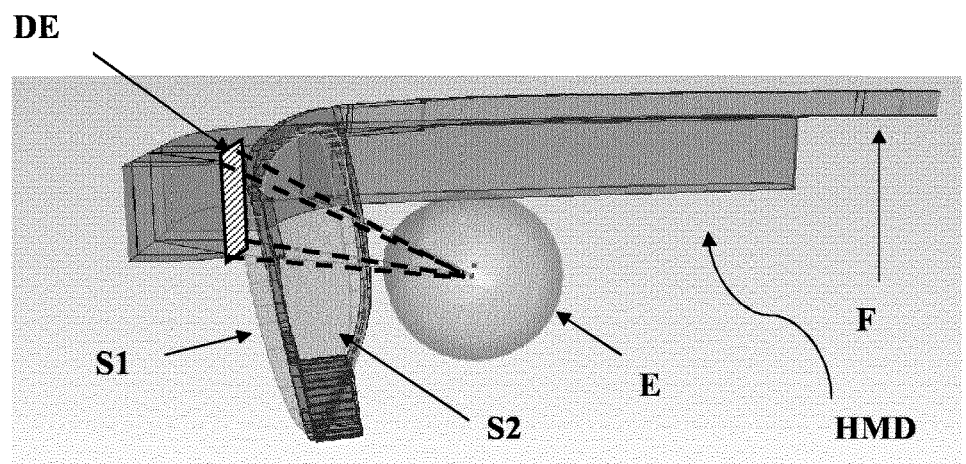
Figure 11A:
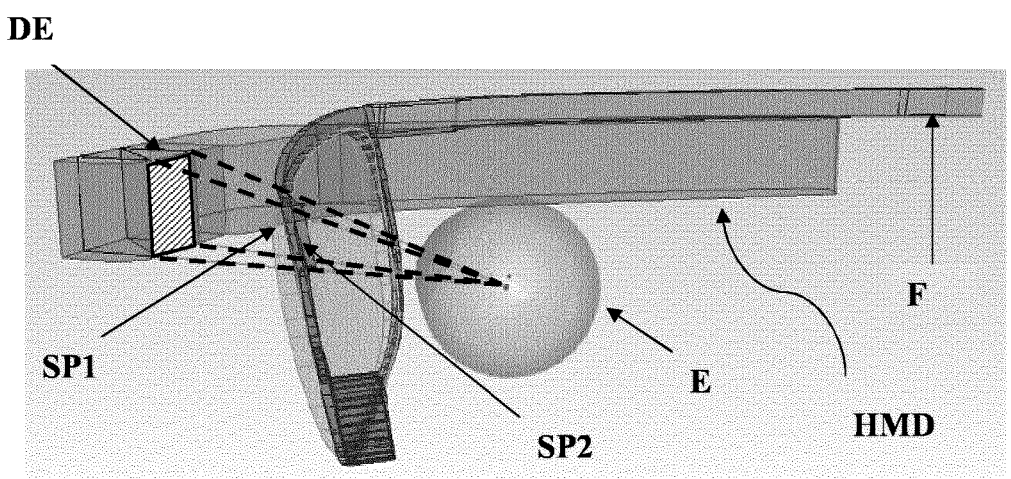
Figure 11B:
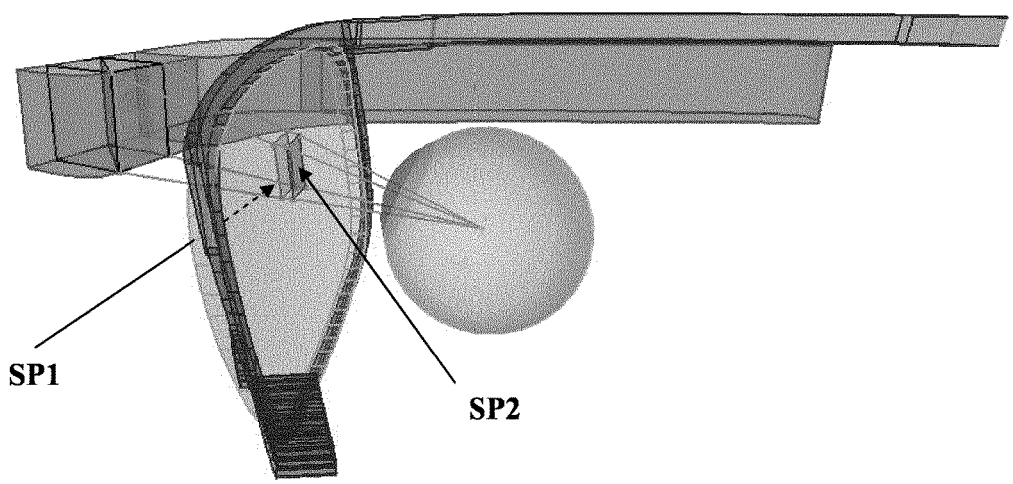
Figure 12:
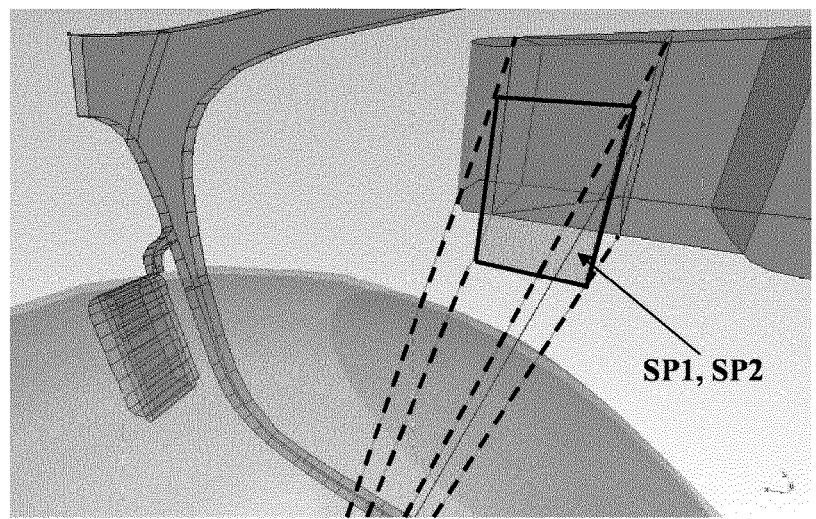

FIGS. 10 and 11a-11b illustrate two different configurations for the HMD. The distance between the HMD and the eye is shorter in the HMD of FIG. 10 than on that of FIG. 11a. Dashed lines show possible ray tracing for the determination of the zone of stabilized optical performance (virtual vision, stabilized optical properties). FIGS. 11b and 12 show sub-parts SP1, SP2.

Example 2: Lenses

Lenses are designed for the following prescription values (P, Asti)=(6.00, 0.00), The following methods are implemented for lens design:

no optimization (NO OPTIM);

first method with target-mediated optical optimization (OPTIM1);

second method with target-mediated optical optimization (OPTIM2);

third method with surface combination (OPTIM3).

No OPTIM rear lens surface is spherical and designed to reach desirable prescription at optical center of the lens;

the lens is analyzed in wearing condition the area of lens useful for virtual vision (zone of stabilized optical performance) has optical power and astigmatism defects of more than 0.5 D;

at the optical center of the lens, there are also defects of optical power (0.06 D) and astigmatism (0.19 D).

Figure 14:
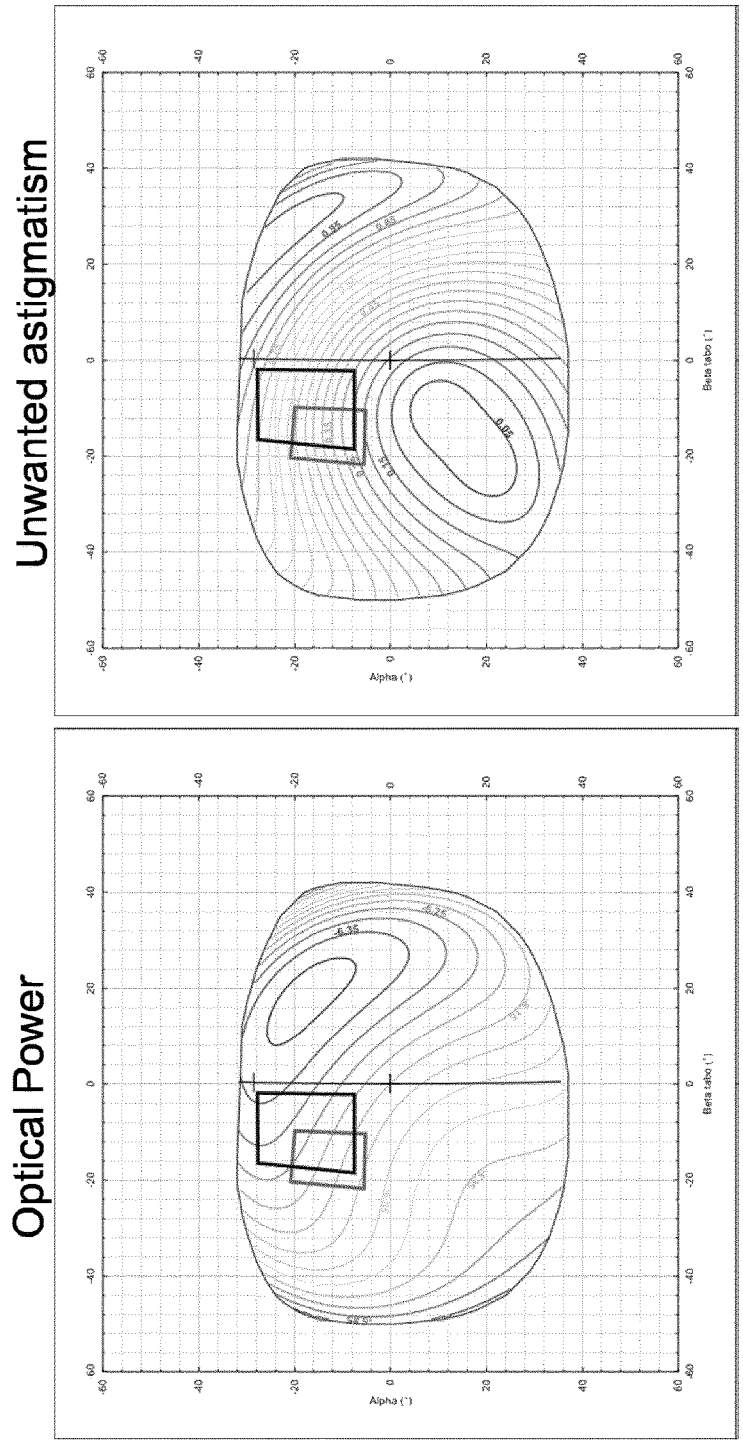

Results are shown on FIG. 14.

OPTIM1 lens is optimized in the desired areas, using target definition;

optimization is carried out by ray tracing (wrap angle 7°, pantoscopic angle (−7°), and CRE-to-lens distance of 25.5 mm);

prism value can de added (0.14°) so as to compensate wrap caused deviation.

Figure 15:
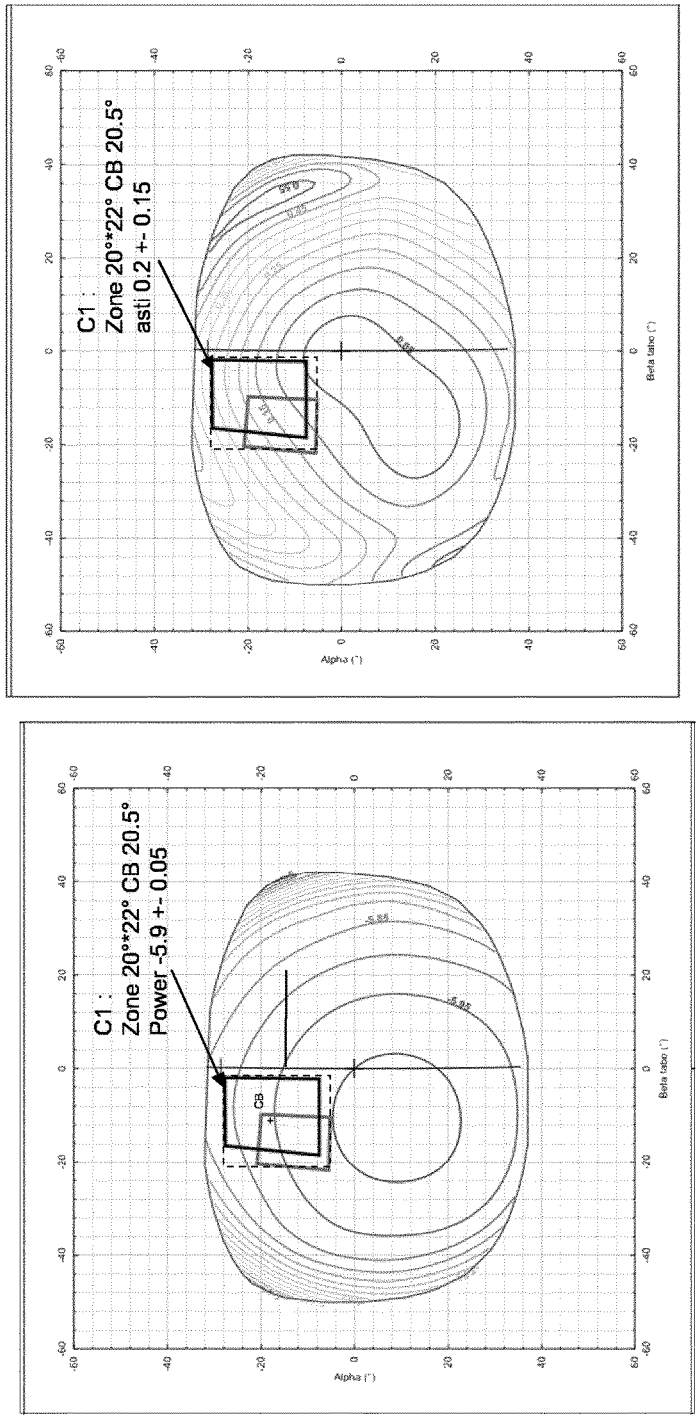
Figure 18:
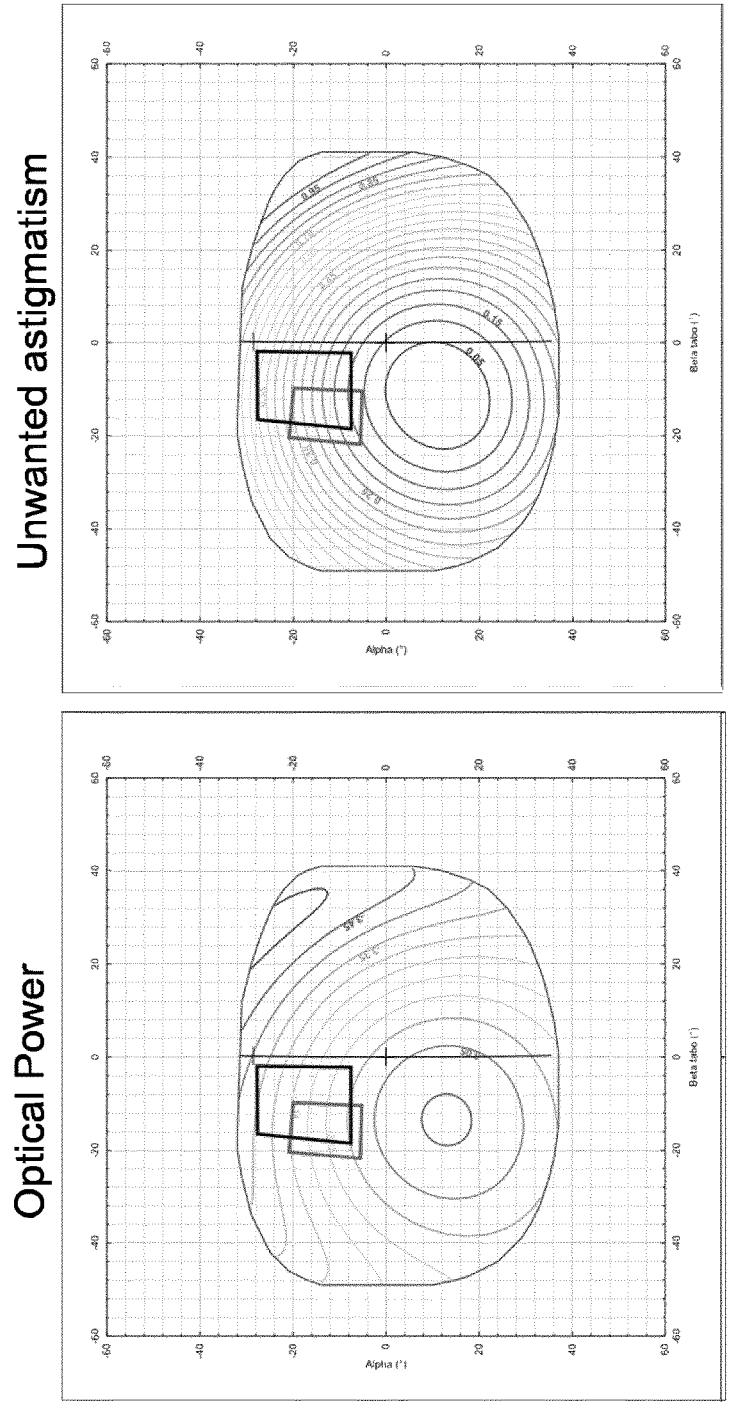
Figure 19:
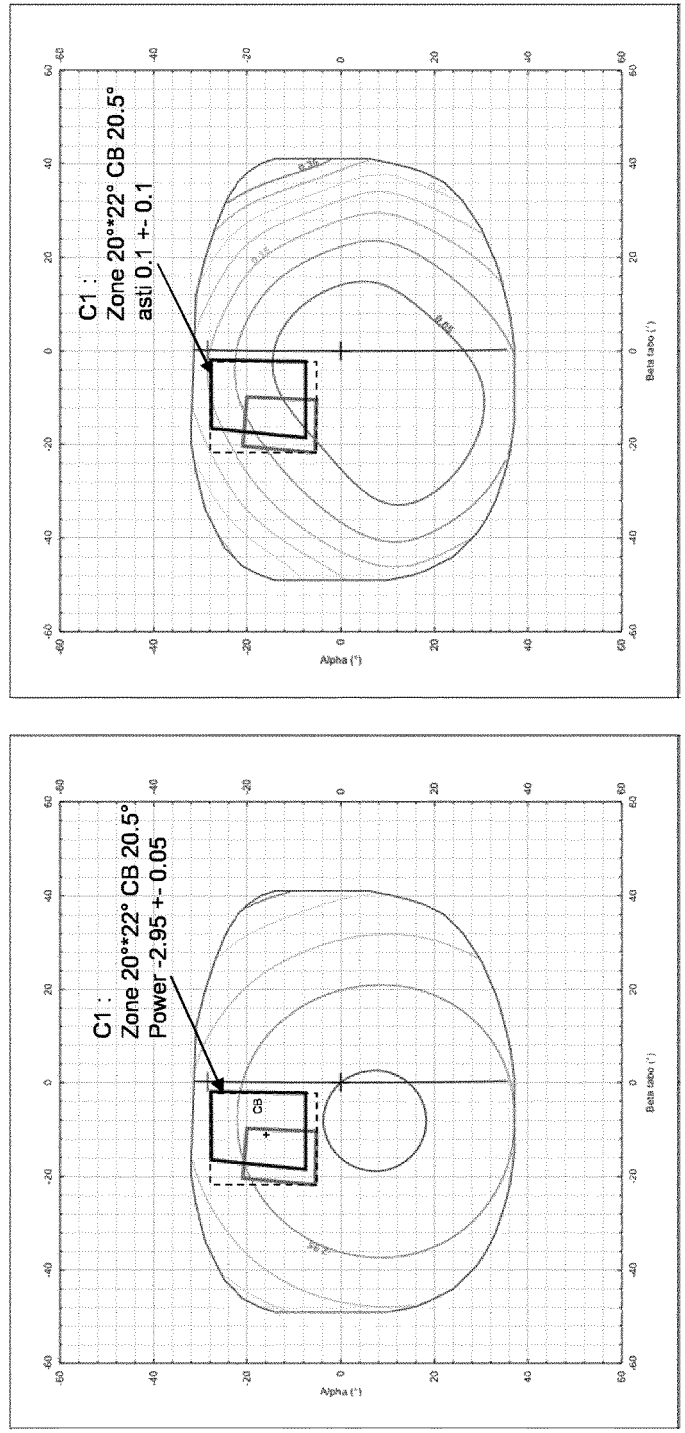
Figure 21:
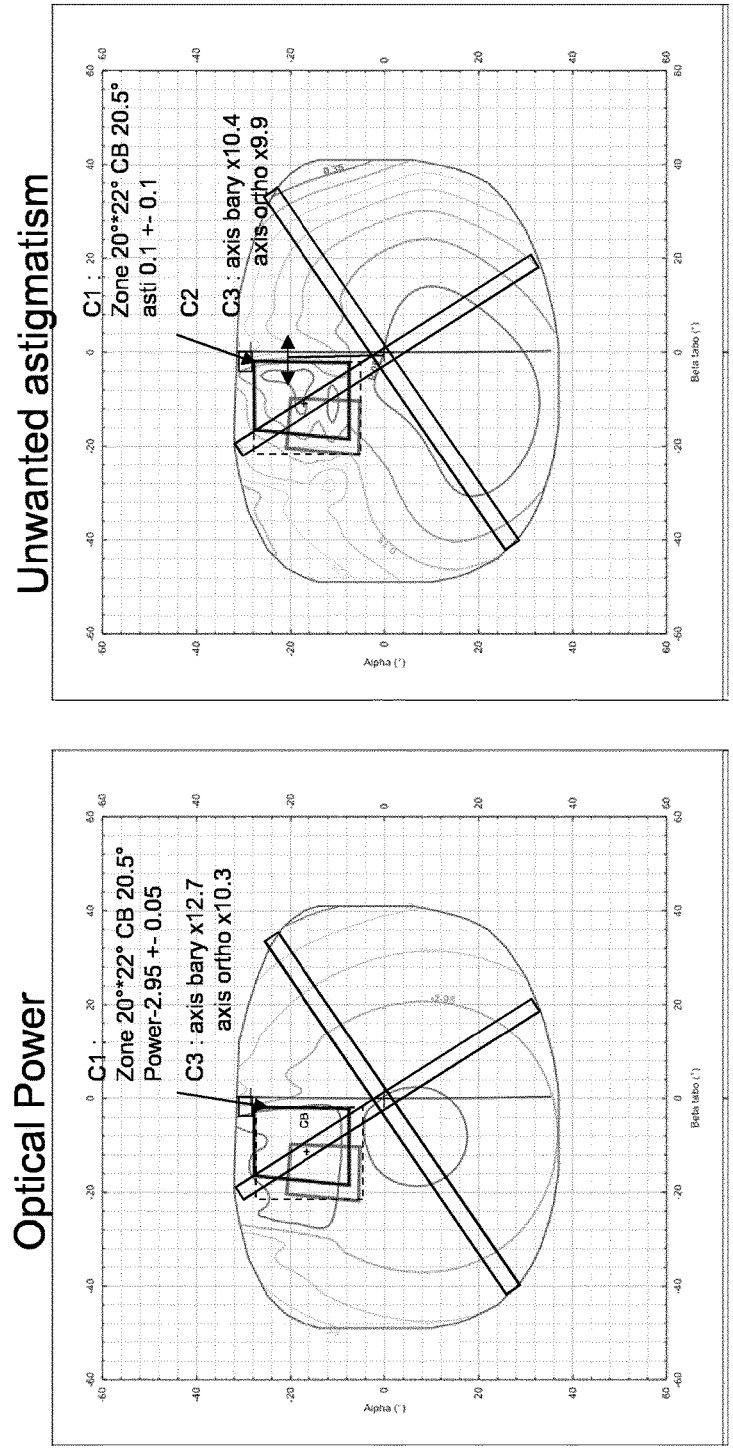
Figure 22:
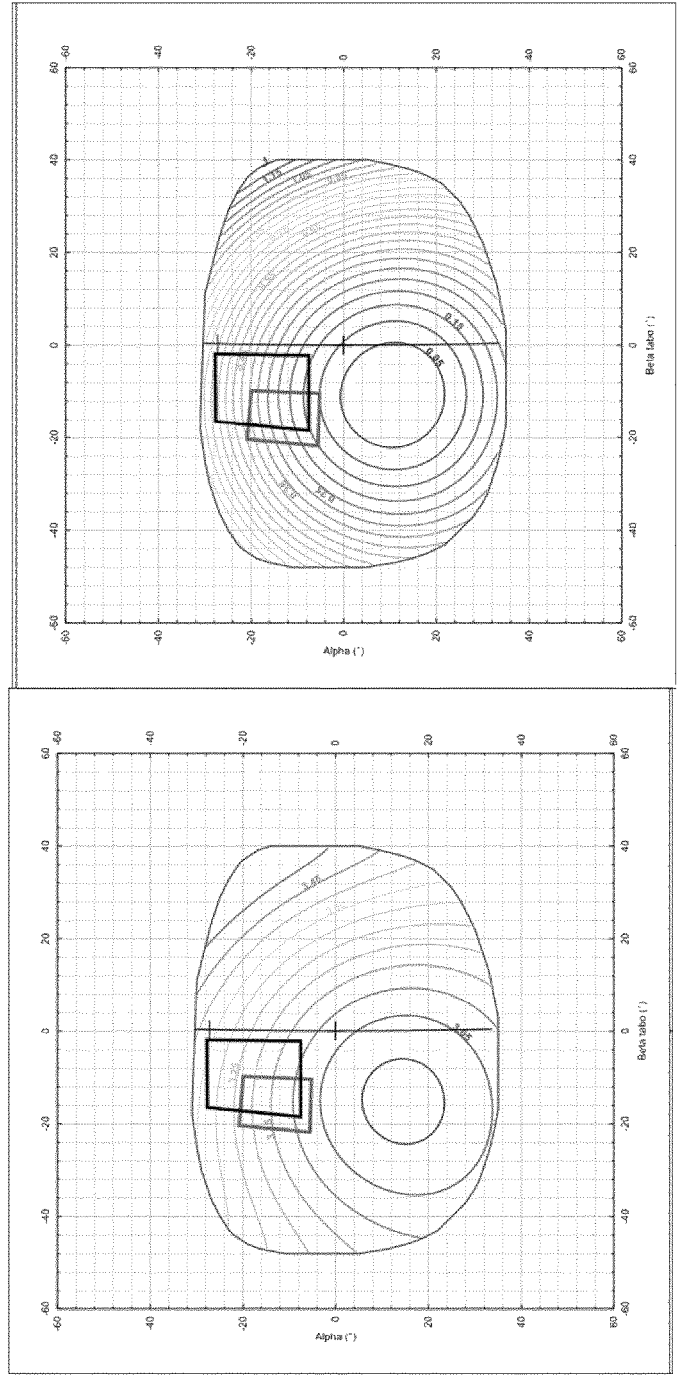
Figure 33:
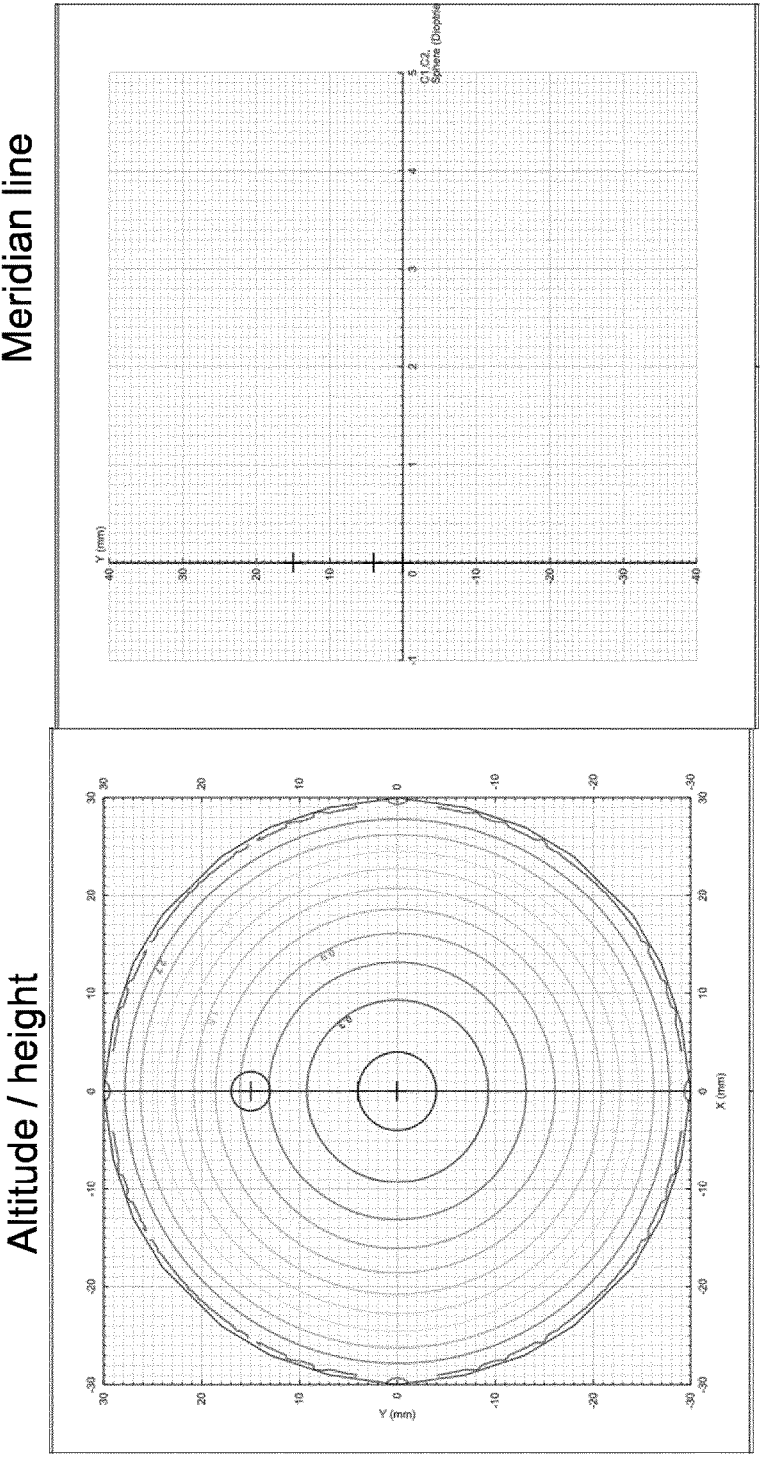
Figure 34:
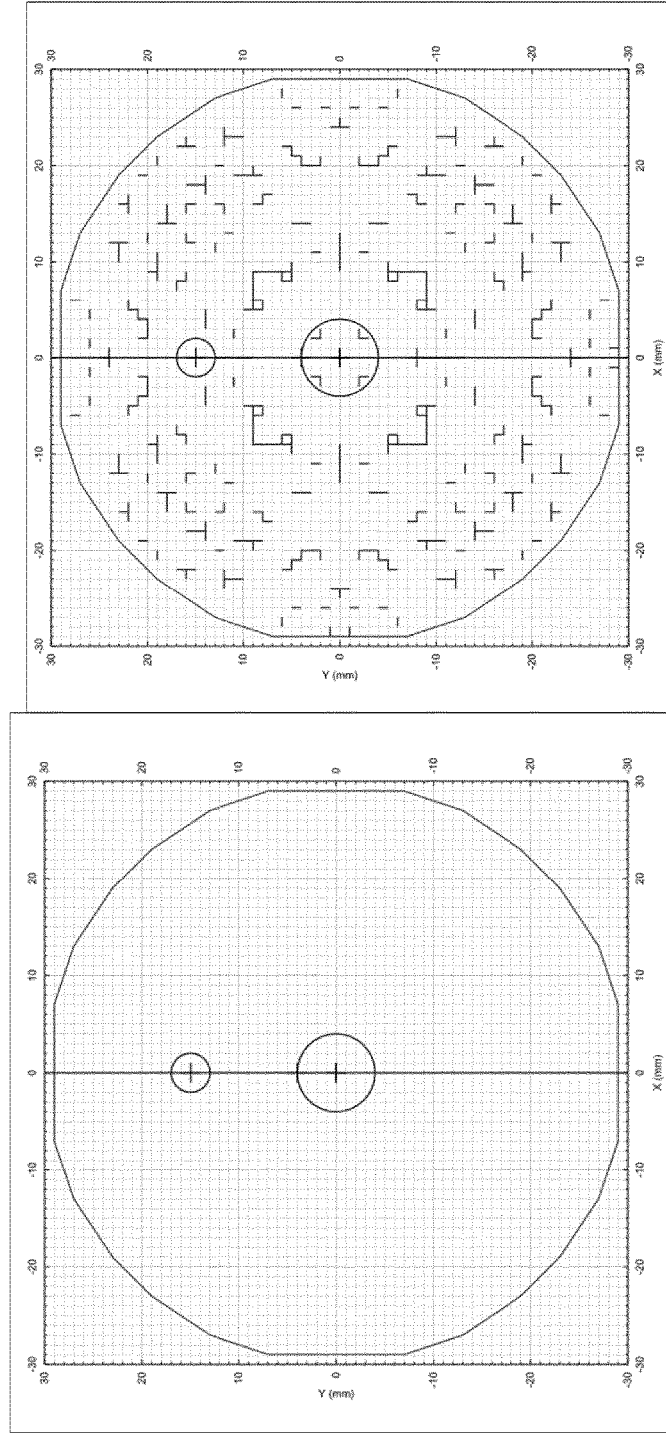
Figure 35:
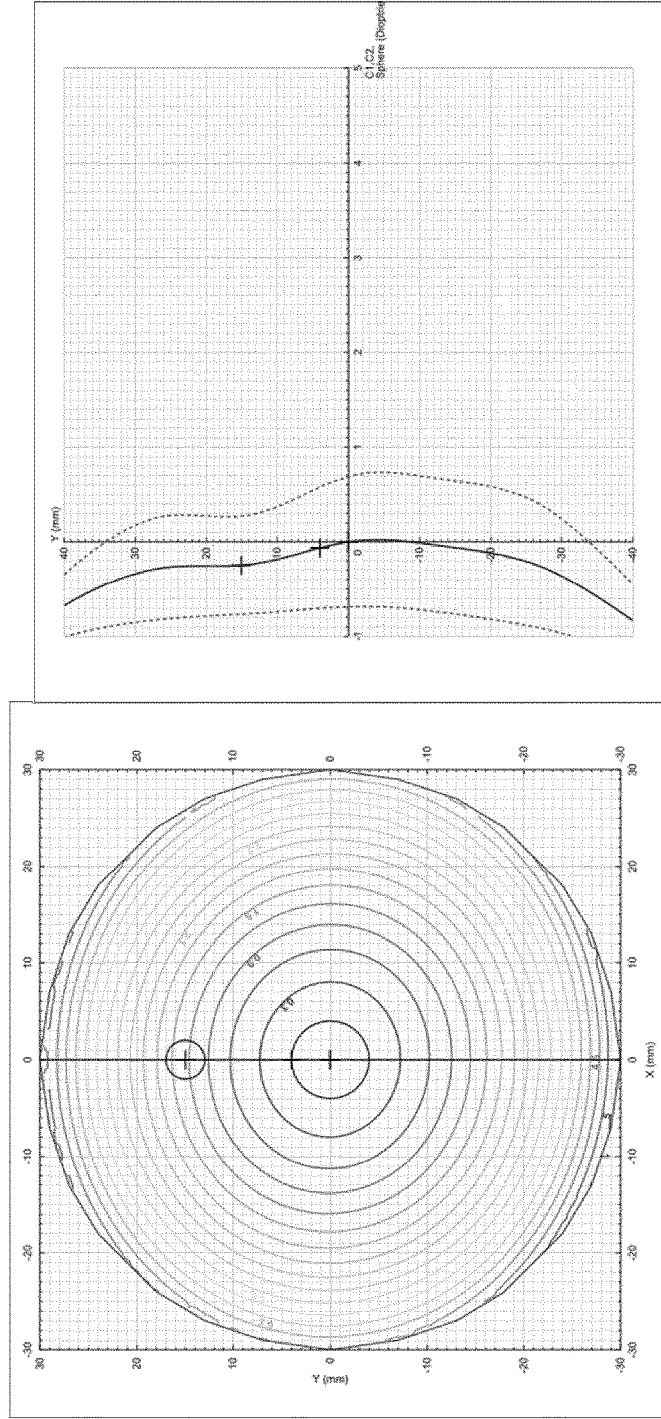
Figure 36:
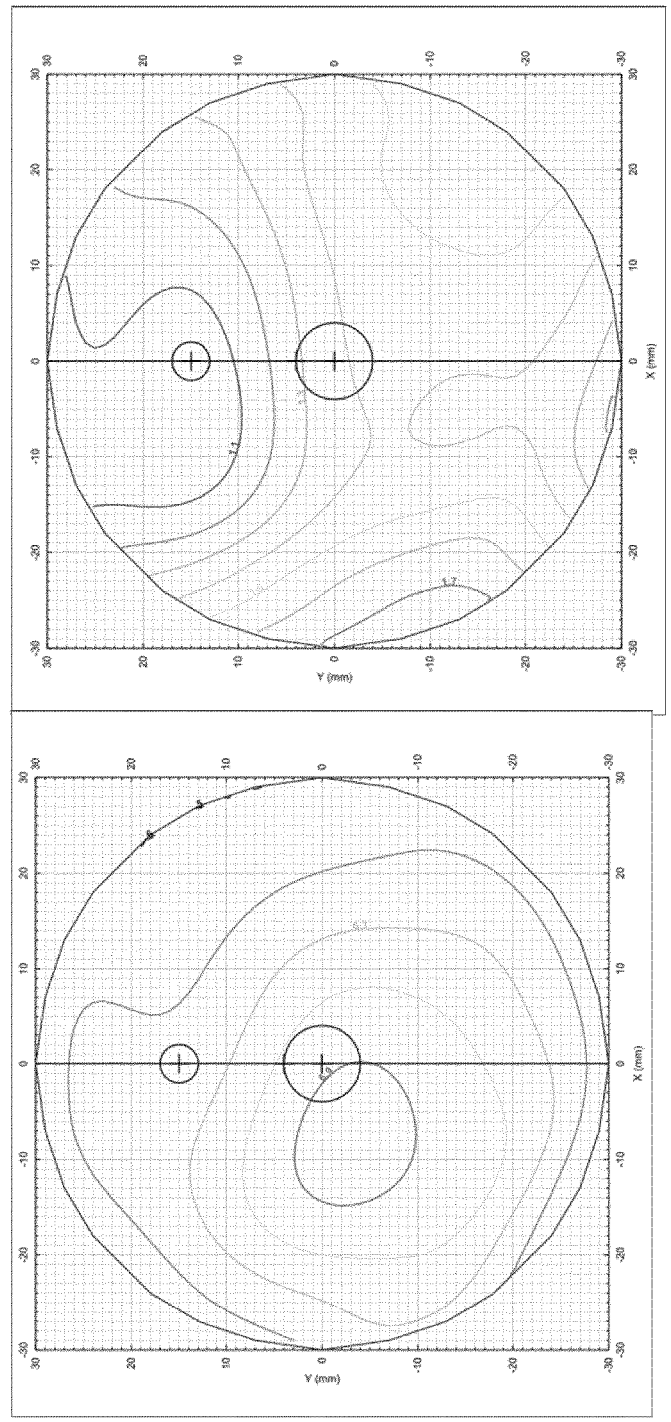
Figure 37:
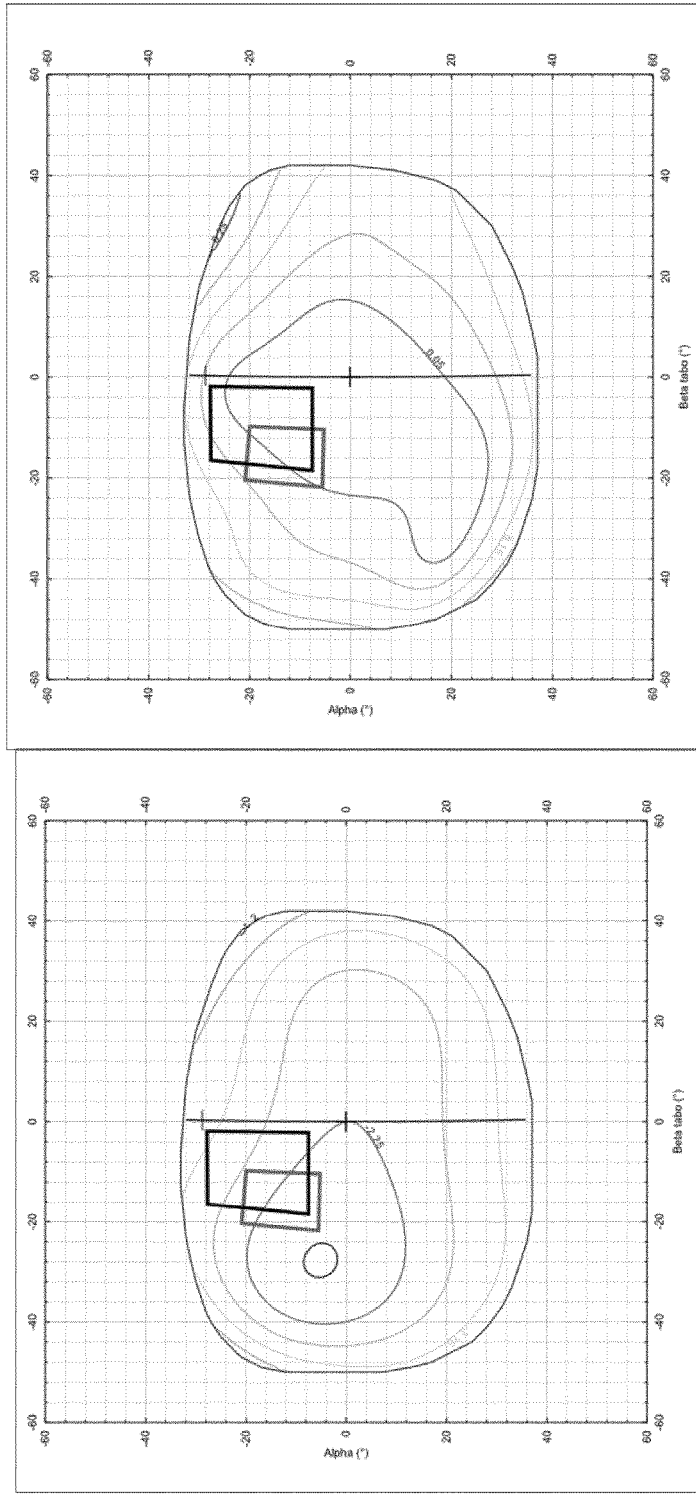
Figure 38:
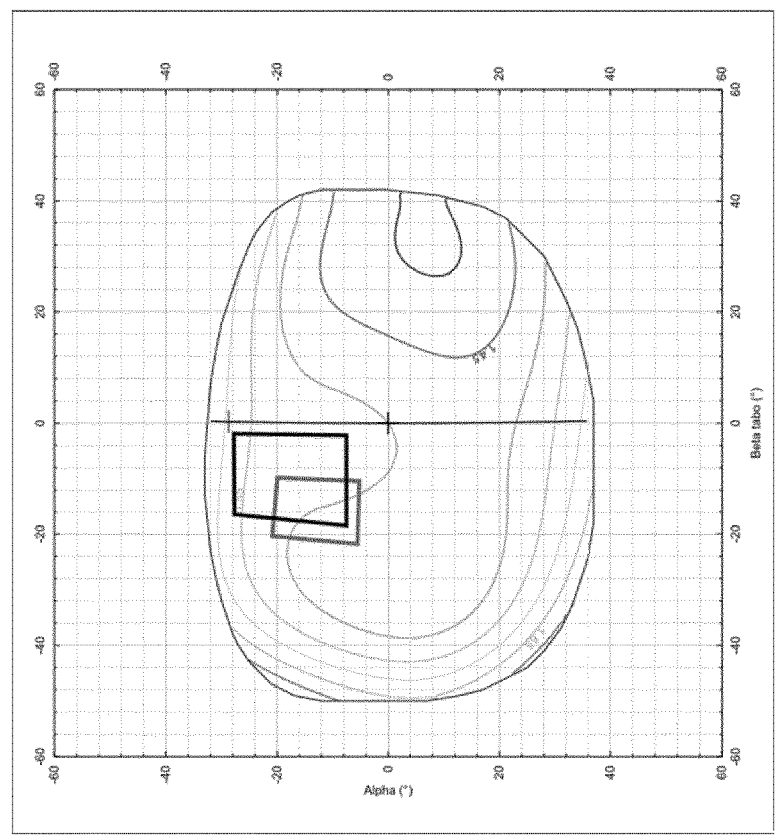

Results are shown on FIG. 15.

OPTIM2 lens is optimized in the desired areas, using target definition, including setting targets in the zone of stabilized optical performance;

optimization is carried out by ray tracing (wrap angle 7°, pantoscopic angle (−7°), and CRE-to-lens distance of 25.5 mm); Results are shown on FIG. 16.

OPTIM3 lens is designed using surface combinations;

the starting lens can be that of OPTIM1;

rear (eye-side) surface is further optimized by subtracting a surface with a suitable weighting coefficient.

Results are shown on FIG. 17.

Other Prescription Values

The methods are repeated for the following prescription values:

| +3.00 | 0.00, | FIGS. 18-21. |
|-------|-------|--------------|
| −3.00 | 0.00, | FIGS. 22-25. |
| −6.00 | 0.00. | FIGS. 26-29. |

Example 3: Single Vision Lenses

Further lenses according to the invention are exemplified (FIGS. 30-38).

All results of Example 2 and 3 show that one or more of the following criteria C1; C2; C3 are met according to the invention:

C1: The zone of stabilized optical performance (SP1, SP2) is arranged so that:
  said second sub-part (SP2) can be inscribed within a square of the eye-side surface (S2) having a length of side of 12-30° when measured as a distance in said $(\alpha,\beta)$ coordinates, with a, $\beta$ expressed in degrees (°);
  said second sub-part (SP2) comprises a geometrical barycenter located on the eye-side surface (S2) of the lens in a location of the eye-side surface (S2) in a peripheral vision gaze direction; wherein the peripheral vision zone is defined as the set of gaze directions $(\alpha i,\beta i)$, with $\alpha i$, $\beta i$ expressed in degrees (°), such that $SQRT(\alpha i^2+\beta i^2) \geq 15°$;
  it is stabilized in terms of optical power and/or unwanted astigmatism, so that over the entire zone, optical power and unwanted astigmatism are essentially of constant value, for example of constant value+/−0.12 D or of constant value of +/−0.06 D;
  said constant value of optical power $P_S$ is essentially equal to the value of optical power at the optical center of the lens $P_C$, for example ABS $(P_S-P_C) \leq 0.25$ D or $\leq 0.12$ D, where ABS denotes absolute value; and
  said constant value of unwanted astigmatism $Asr_S$ is essentially equal to the value of optical power at the optical center of the lens $Asr_C$, for example ABS $(Asr_S-Asr_C) \leq 0.25$ D or $\leq 0.12$ D, where ABS denotes absolute value;

C2: $\theta \geq 45°$, with $\beta$ expressed in degrees.
  Preferably: $\theta > 70°$, and
  optionally, the geometrical barycenter of the zone of stabilized optical performance is located at $(\alpha B, \beta B)$ in said $(\alpha,\beta)$ coordinates, with ABS$(\alpha_B) \leq 10°$ or ABS$(\beta_B) \leq 10°$, wherein ABS denotes absolute value.

C3: said second sub-part (SP2) or the periphery of said second sub-part (SP2) contains at least one point at which:
  the module of the gradient of optical power is at least five times the value of the average module of the gradient of optical power, and/or
  the module of the gradient of unwanted astigmatism is at least five times the value of the average module of the gradient of unwanted astigmatism,
  wherein the average module of the gradient of optical power, respectively the average module of unwanted astigmatism, is determined:
  along a first referencing line of the lens passing by the geometrical barycenter of said second sub-part (SP2) and the optical center of the lens, or
  along a second referencing line of the lens that is perpendicular to the first referencing line and passing by the optical center of the lens;
  and preferably is determined:
  along a first segment of the first referencing line, or
  along a second segment of the second referencing line, wherein said first and second segment are both centered on the optical center of the lens and have both a same length (SL), wherein said length (SL) is smaller than twice the greatest distance separating the optical center of the lens from any point of said second sub-part (SP2).

LEGEND OF FIGURES

The tetragons in bold lines correspond to two extreme configurations of display element on the HMD frame.
Box in dash line shows the square in which the zone of stabilized optical performance is inscribed.
The double arrow shows a gradient and illustrates the value of $\theta$.
C1 (resp. C2, C3) indicates that criterion C1 (resp. C2, C3) is met.

The invention claimed is:

1. An ophthalmic lens supply system for providing an ophthalmic lens intended for a wearer, wherein:
  the ophthalmic lens includes an object-side surface and an eye-side surface,
  wherein the ophthalmic lens is arranged to correct an ametropia of one eye of the wearer, and the ophthalmic lens is configured to be fitted onto a head-mounted device,
  the head-mounted device includes a display element,
  wherein the display element is configured to display information content by emitting light towards the eye of the wearer, such that the light emitted by the display element is refracted by the object-side surface and then by the eye-side surface of the ophthalmic lens before reaching the eye of the wearer,
  the supply system comprising:
  first processing circuitry configured to place an order of an ophthalmic lens, wherein the first processing circuitry is located at a lens ordering side and wherein the first processing circuitry is configured to:
    receive wearer data,
      wherein the wearer data comprises prescription data relating to the eye, or prescribed optical power and/or prescribed astigmatism, and biometry data; and
    receive head-mounted device data;
      wherein the head-mounted device data comprises display element data or data pertaining to a location, orientation and geometry of the display element, or a virtual display distance, the virtual display distance being a distance at which the information content is displayed by the display element for visualization by the wearer;
  second processing circuitry configured to process lens data based upon wearer data and head-mounted device data, by
    providing the wearer data including prescription data relating to the eye of the wearer,
    providing data relating to the head-mounted device, including the display element data,
    based upon the data relating to the head-mounted device, defining a location, on the lens, of a zone of stabilized optical performance, and determining the ophthalmic lens by:
taking into account the wearer data, and
determining, by optical or surface definition, the zone of stabilized optical performance, such that the ophthalmic lens comprises:
a central vision zone arranged to correct the ametropia of the eye of the wearer, to provide an acuity for natural vision by the wearer, and
a peripheral vision zone comprising an optical system configured to correct the ametropia of the eye of the wearer, to provide an acuity for virtual vision, by the wearer, of information content displayed by the display element;
wherein the second processing circuitry is located at a lens determination side and wherein the second processing circuitry is configured to output the lens data, and
wherein the first processing circuitry is configured to transmit the wearer data and head-mounted device data, from the first processing circuitry to the second processing circuitry.

2. The ophthalmic lens supply system of claim 1, further comprising:
a manufacturing device configured to manufacture an ophthalmic lens based upon lens data, wherein the manufacturing device is located at a lens manufacturing side wherein
the second processing circuitry is configured to transmit the lens data from the second processing circuitry to the manufacturing device.

* * * * *